US007967932B2

(12) United States Patent
Umeda et al.

(10) Patent No.: US 7,967,932 B2
(45) Date of Patent: Jun. 28, 2011

(54) METHOD FOR CONTINUOUSLY FORMING STRUCTURAL MEMBER

(75) Inventors: Katsuhiko Umeda, Tokyo (JP); Kazumi Asari, Tokyo (JP); Shuntaro Kuriyama, Tokyo (JP)

(73) Assignee: Jamco Corporation, Tokyo (JP)

( * ) Notice: Subject to any disclaimer, the term of this patent is extended or adjusted under 35 U.S.C. 154(b) by 630 days.

(21) Appl. No.: 11/905,650

(22) Filed: Oct. 3, 2007

(65) Prior Publication Data

US 2008/0099131 A1    May 1, 2008

(30) Foreign Application Priority Data

Oct. 31, 2006  (JP) ................................ 2006-295219

(51) Int. Cl.
 *B32B 37/00* (2006.01)
(52) U.S. Cl. ......... 156/180; 156/166; 156/242; 156/245
(58) Field of Classification Search .............. 156/166, 156/180, 242, 245
 See application file for complete search history.

(56) References Cited

U.S. PATENT DOCUMENTS

| | | | |
|---|---|---|---|
| 4,020,202 A | | 4/1977 | Kreft |
| 4,151,031 A | | 4/1979 | Goad et al. |
| 5,043,128 A | | 8/1991 | Umeda |
| 5,055,242 A | * | 10/1991 | Vane .............................. 264/463 |
| 5,127,980 A | * | 7/1992 | Cavin ........................... 156/441 |
| 6,569,371 B1 | * | 5/2003 | Asari et al. .................... 264/231 |

FOREIGN PATENT DOCUMENTS

| | | |
|---|---|---|
| DE | 10 2005 039 500 A1 | 2/2007 |
| EP | 1040901 A1 | 10/2000 |
| EP | 1116575 A2 | 7/2001 |
| EP | 1504880 A1 | 2/2005 |
| JP | 64-4315 A | 1/1989 |
| JP | 2-102029 A | 4/1990 |
| JP | 3012847 B1 | 2/2000 |
| JP | 3402481 B2 | 5/2003 |
| JP | 3742082 B2 | 2/2006 |
| WO | WO00/47397 A1 * | 8/2000 |

OTHER PUBLICATIONS

European Search Report dated Feb. 1, 2008, issued in corresponding European Patent Application No. 07405289.
Extended European Search Report dated Apr. 16, 2008, issued in corresponding application No. 07405289.5-2307.
Wise "New Technique for Joining Dissimilar Materials" Welding Review International Business and Technical Magazines, Redhill, GB vol. 12, No. 1, Feb. 1, 1993, pp. 40-42.

\* cited by examiner

*Primary Examiner* — Jeff H Aftergut
(74) *Attorney, Agent, or Firm* — Westerman, Hattori, Daniels & Adrian, LLP

(57) ABSTRACT

The invention provides an improved method for forming a composite material mainly composed of carbon fiber. It is difficult to form an H-shaped structural member formed of a prepreg material having carbon fiber fabric impregnated with epoxy resin into a member having curvature. Thus, the structural member is divided into two bendable constructional elements 110 and 120, which are bent to given curvature then adhesively-bonded to form a structural member having curvature.

4 Claims, 28 Drawing Sheets

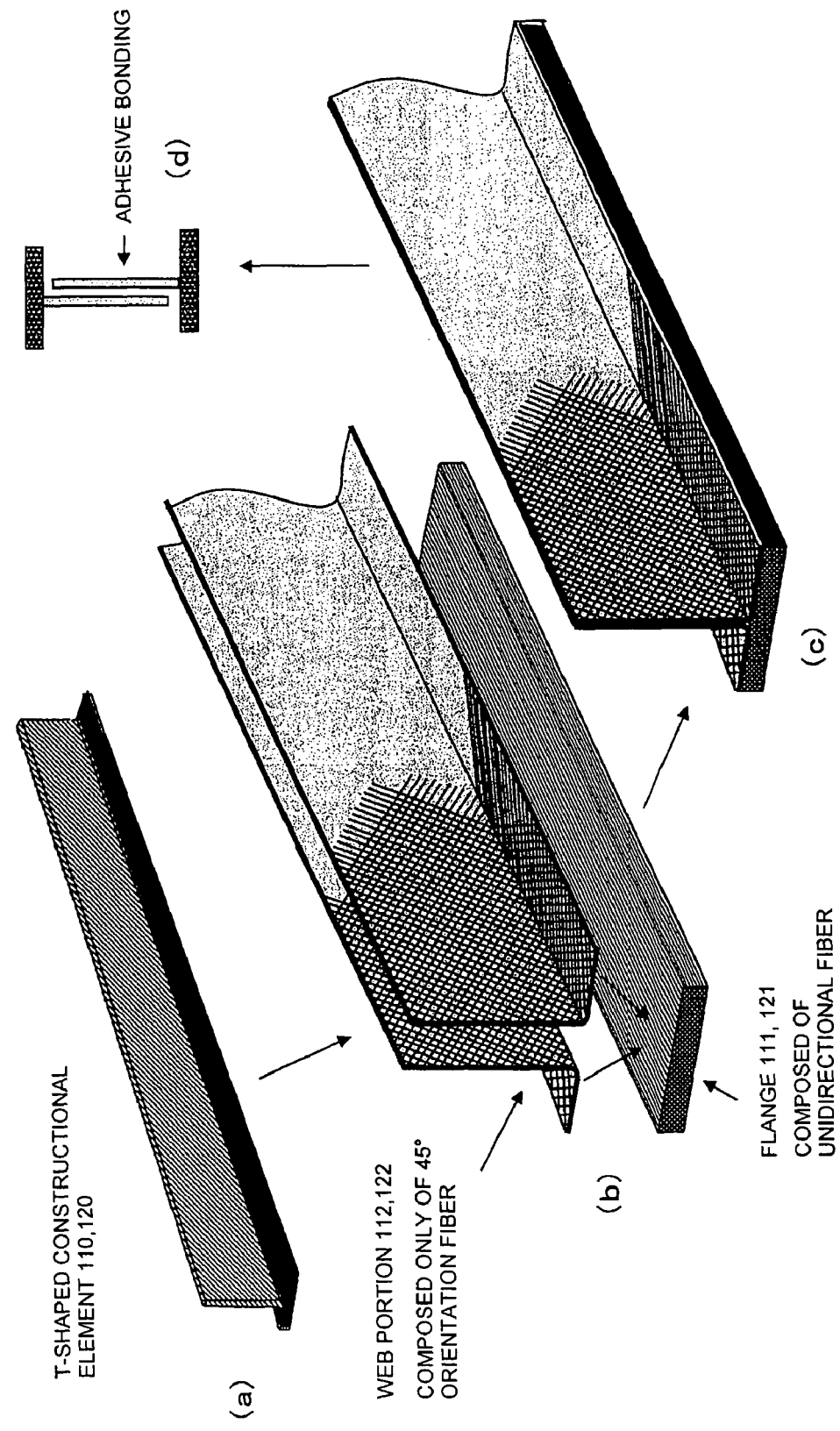

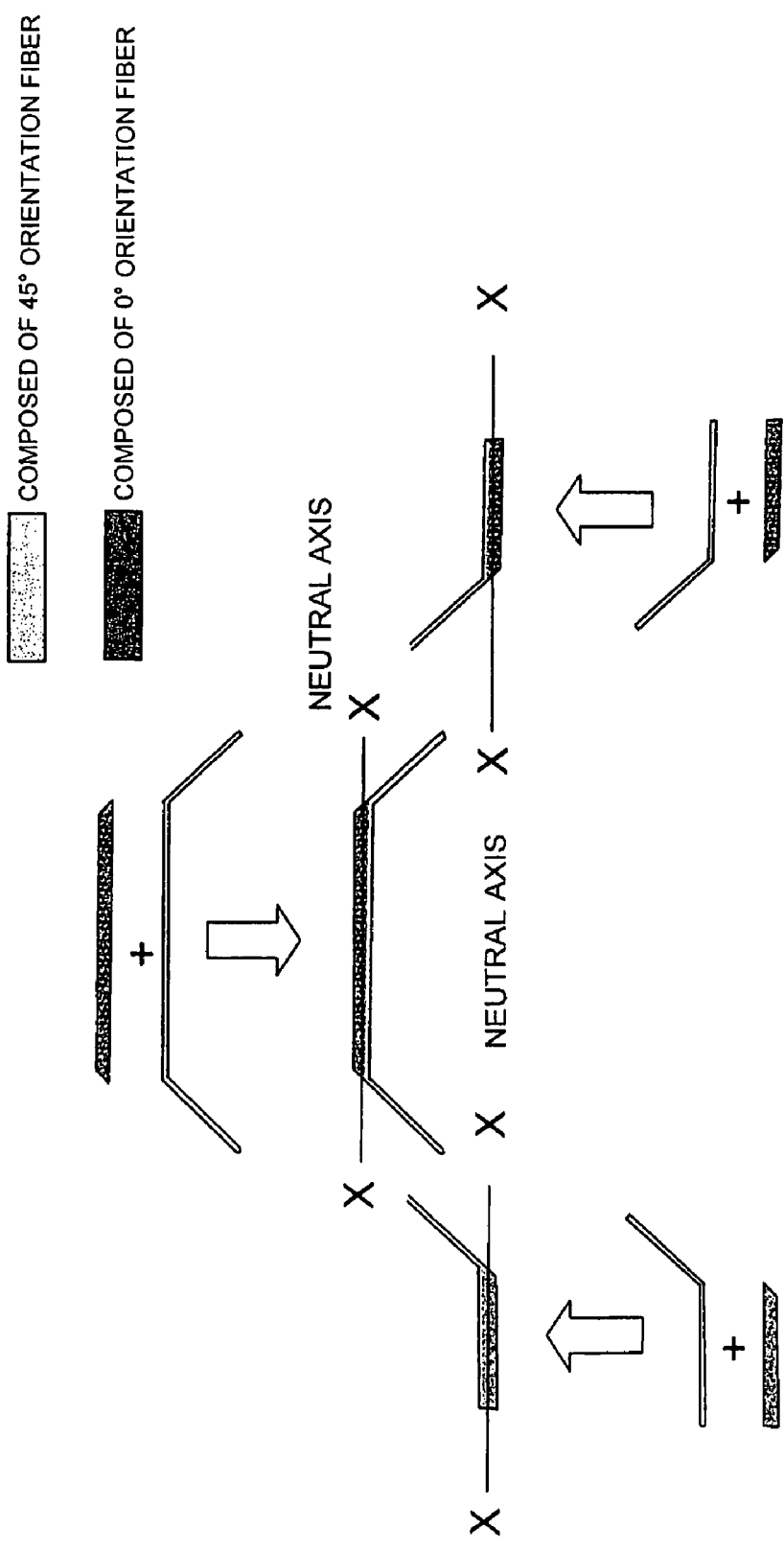
Fig.7-2 FIBER ORIENTATION STRUCTURE AND NEUTRAL AXIS OF EMBODIMENT 2

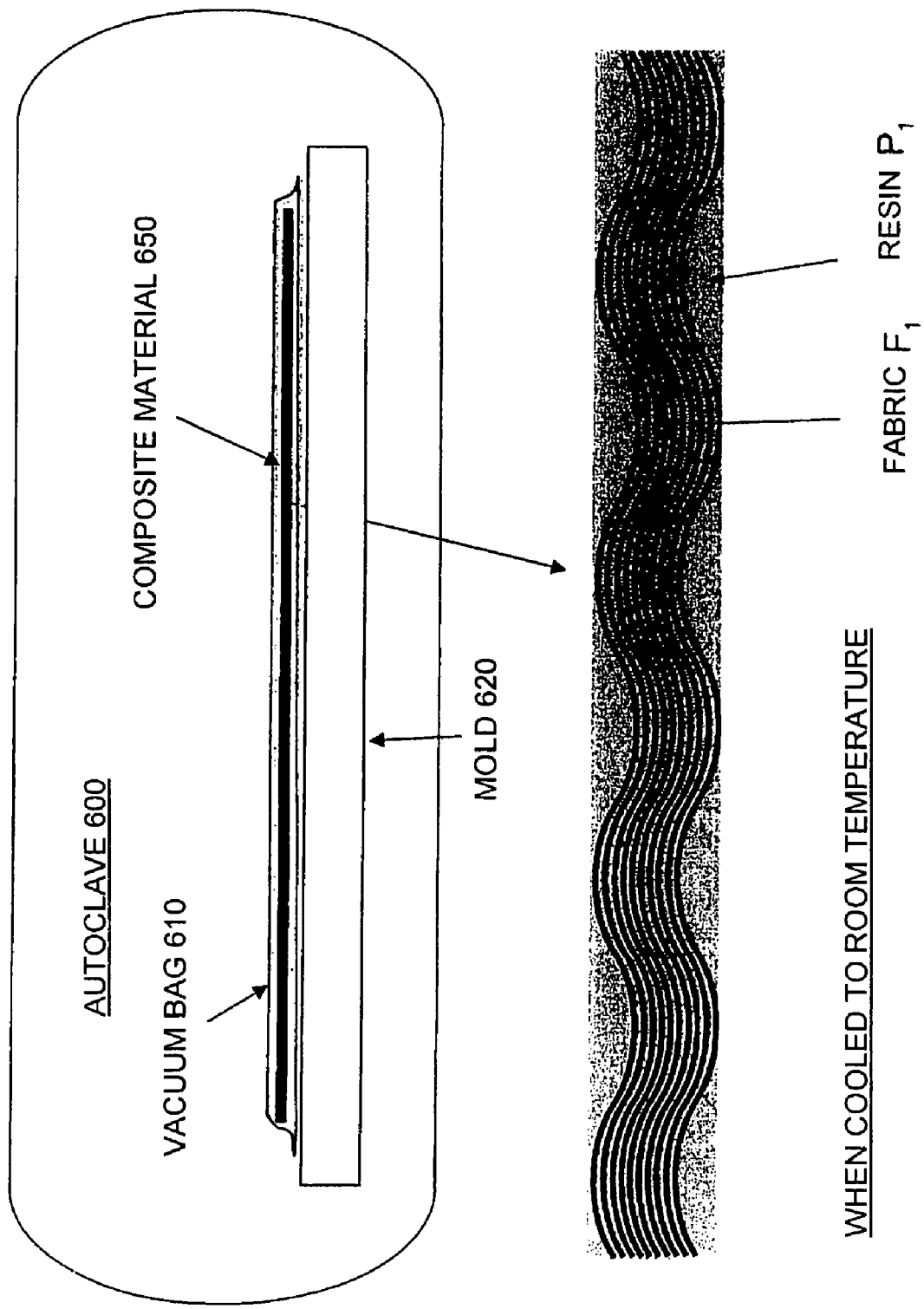

METHOD FOR CONTINUOUSLY FORMING STRUCTURAL MEMBER

The present application is based on and claims priority of Japanese patent application No. 2006-295219 filed on Oct. 31, 2006, the entire contents of which are hereby incorporated by reference.

BACKGROUND OF THE INVENTION

1. Field of the Invention

The present invention relates to a method for continuously forming a structural member using a composite material.

2. Description of the Related Art

One typical method for forming a structural member using a composite material mainly composed of carbon fiber is the forming method using an autoclave device.

FIG. 16 illustrates the outline of the manufacturing method using an autoclave device 600, wherein the composite material used in the autoclave forming method is a material called a carbon fiber/epoxy prepreg, in which a carbon fiber fabric is impregnated with epoxy resin.

In this method, nitrogen gas is filled in a can 600 of the autoclave device, and the pressure and temperature of nitrogen gas is raised to press and heat a material 650 sealed in a vacuum bag 610 so as to form the material. According to this method, it becomes possible to form a high quality structural member 650 having surfaces of second/third-order curvature, or other complex shapes.

However, the prior art method has inferior production efficiency and high costs, since the method requires a large-scale autoclave device 600 and a large mold (molding jig) 620, requires molding processes involving manpower called lay-up and set-up, and produces only a limited number of products in a single molding process.

[Influence of Thermal Expansion]

In addition, the method has a drawback in that the influence of thermal expansion coefficient that differs according to the material causes undulation (fluctuation) of the carbon fibers $F_1$ that constitute the fabricated structural member, by which both the strength and elastic modulus of the member are deteriorated, and as a result, the flexural rigidity in the low stress area is deteriorated.

The thermal expansion coefficient of the carbon fiber $F_1$ itself as main material is zero or minus, but on the other hand, the thermal expansion coefficient of the epoxy resin $P_1$ solidifying the fiber is as high as 65 PPM.

In the autoclave method, aluminum alloy having superior thermal conductance is used as the material of the mold (jig) 620 so as to improve the thermal conductance from the nitrogen gas to the prepreg material 650.

Since the thermal expansion coefficient of aluminum alloy is as high as 23 PPM, the mold 620 heated in the autoclave can is expanded greatly due to thermal expansion.

When the carbon fiber $F_1$ is heated for 160° C. from the room temperature of 20° C. to the heating temperature of 180° C., it will not expand, but the resin $P_1$ contained in the prepreg is greatly expanded via thermal expansion when the curing is completed, though it is somewhat constrained by the fiber $F_1$.

Similarly, when the temperature is raised by 160° C., the thermal expansion of the mold 620 reaches 0.37% since it is not constrained by the carbon fiber $F_1$, and the thermal expansion of the mold 620 having a length of 2 meters is as large as 7.4 mm.

When heated, the carbon fiber $F_1$ is stretched via the resin $P_1$ and the mold 620, and straightened.

When the heating/pressing step is terminated and a cooling step is started, the mold 620 and the cured epoxy resin $P_1$ start to shrink.

At this time, since the carbon fiber $F_1$ is not subjected to thermal contraction, and since it has high elastic modulus and thus is not subjected to stress contraction, the fiber is slightly buckled in a wavelike form (fluctuated state) when the step is terminated, as shown in the conceptual diagram of FIG. 17.

When tensile load is applied to the structural member fabricated as above, as shown in FIG. 18, the members shows a low elastic modulus until the buckling of the fiber is eliminated and straightened.

That is, in the initial low stress area, the stress/strain relationship is not proportional but is represented by a curve as shown in portion A of FIG. 18, and only after the fibers are straightened that the elastic modulus of the material itself will be seen, as shown in portion B of FIG. 18.

As described, in the low stress area, a large deformation (strain) is created and the elastic modulus is small.

On the other hand, if compressive load is applied, the buckling of the fiber is increased, so that the stress-strain diagram shows a low elastic modulus as illustrated in portion C of FIG. 18, which finally results in buckling.

When a group of fibers solidified by resin receives compressive load, the compressive elastic modulus and the buckling strength varies according to the initial straightness of the fibers, as shown in FIG. 19.

Line LA represents a case in which the fibers are straight, line LB represents a case in which the fibers are slightly undulated, and line LC represents a case in which the fibers are greatly undulated.

Even after the fibers are buckled, the surrounding resin supports the fiber, so the member exerts some level of stress.

The above-mentioned phenomenon is called "micro-buckling" in the Society for Composite Materials, and studies regarding the phenomenon are conducted.

One means for solving the problem of fluctuation is the use of a mold formed of a special metal material having zero thermal expansion coefficient called an inver instead of the mold made of aluminum alloy, but there are drawbacks in that the material is expensive, the processing thereof is difficult, and the thermal conductivity is as small as stainless steel, which elongates the time required for the heating step.

The above is a description of the forming method using an autoclave.

Another possible forming method is the hot press forming method.

The method is advantageous in that it has high productivity, and is suitable for manufacturing panel products, but due to limitations regarding the press mold and the pressurizing direction, the method is not suitable for forming structural members having a complex cross-sectional shape, or for forming long structural members.

When manufacturing a large-sized product, since it is difficult to ensure the surface accuracy of the press mold, it is difficult to manufacture an accurate structural member.

When steel having low thermal expansion coefficient is used to form the press mold of the hot press, thermal expansion of the press mold will not affect the product greatly, however, thermal contraction of resin will inevitably affect the product.

In addition to the above-mentioned forming methods, there is known another method so-called a pultrusion method for continuously forming a long composite material.

This method involves passing long fibers in a mold, pulling and forming the same, and simultaneously curing the resin impregnated in the fibers in a short time. The method not only has advantageous productivity, but since tension is constantly applied during the forming process, the undulation of fibers is minimized, so that the material characteristic is improved. However, the method cannot be applied to form a structural member having a complex cross-sectional shape or a structural member having high quality.

"ADP Forming Method"

An ADP forming method is a forming method having developed the pultrusion forming method, and the present applicant has acquired a patent related to the continuous forming method thereof in Japanese Patent No. 1886522 (patent document 1).

The forming method of patent document 1 (ADP forming method) utilizes a prepreg material in which a group of fibers are impregnated with resin and semi-cured in advance.

As shown in FIG. 20, the method is a continuous forming method comprising feeding a prepreg material 702 wound around a roll 701, overlapping necessary number of prepreg materials 702, passing the same through an injection mold 700, intermittently pressing and heating while pulling the member so that the impregnated resin is cured, and moving the member for a short distance during removal of pressure.

A device 700 for heating and pressing the prepreg material 702 has the same structure as a common small-sized thermo-forming press, for intermittently heating and pressing the material.

The device at the center of FIG. 20-1 is a post-cure furnace 720 for completely curing the resin, wherein the material is moved from left to right while the resin is completely cured.

The device at the right end side of FIG. 20-1 is a device 730 for intermittently moving the material in correspondence with the pressure removal cycle.

A pressurizing cylinder 731 for applying friction is repeatedly moved via a sender cylinder 732, by which the material is moved.

FIG. 20-2 illustrates a structure of a mold for forming a T-shaped structural member, wherein an injection mold 750 of the heating and pressing device 700 is divided into three upper and lower parts 751, 752 and 753 having a cross-sectional shape corresponding to the structural member to be formed, each having a heating device 740 built therein.

The upper parts 751 and 752 of the mold are moved up and down via pressure cylinders 761 and 762, by which the material is intermittently pressed.

The pressing pressure is approximately 3 Kg/cm$^2$, and the pressing cycle repeats pressing for 30 seconds and removing pressure for approximately 2 seconds.

During the pressure removal step, the material is moved for approximately 30 mm, so that the traveling speed thereof is approximately 3.4 m per hour.

The heating temperature is determined by the thermal curing property of the impregnated resin, which is in the range of 120 to 180° C., and the structural member having passed through the curing furnace and completely cured is then cut into predetermined lengths with a saw.

The above is a description of the ADP forming method.

The ADP forming method is advantageous compared to the pultrusion method since it can form a structural member with high quality and complex material configuration, and since tension is applied to the fiber though slightly during the forming process, the "fluctuation" of fibers is reduced and the material characteristic as a member is improved. However, there is a limitation to the cross-sectional shape of the member to be formed due to limitations regarding the shapes of molds for heating and pressing the material and the limitations regarding pressing direction.

Structural members having intense curvature, structural members having a hollow structure and structural members having torsion are demanded as structural members of aircrafts, but such structural members are difficult to form using the ADP forming method.

Therefore, the applicant of the present invention has conducted further researches and acquired patents related to the continuous forming method of a composite material member having a certain curvature in Japanese Patent No. 3402481, No. 1886560, No. 3012847 and No. 3742082. However, the cross-sectional shapes and curvatures of the members to be formed are still limited.

The structural members using advanced composite materials are light-weight and have high strength, but the method for forming the same are not yet developed, so the advanced properties of the materials are not fully utilized.

SUMMARY OF THE INVENTION

The present invention aims at solving the problems of the prior art by providing a method for forming structural members having superior quality using a composite material, the method being capable of forming curved structural members, hollow structural members, long structural members and torsional structural members with a given torsion rate.

The present invention further aims at providing a method for forming structural members having high flexural rigidity in a low stress area while minimizing the "fluctuation" of the fiber caused during the forming process.

The present invention combines the following three basic means for solving the problem.

Basic Means K–1

The structural member to be formed is divided into two or more constructional elements in advance, each construction element capable of being bent independently due to the "fiber orientation" constituting the construction element, and each element is prepared in a bent state or a state in which the element can be bent.

Then, the constructional elements are fitted together, which are adhesively bonded via the following basic means K–2, so as to form a structural member having a high flexural rigidity.

Therefore, the constructional elements exert the strength as a structural member only when they are combined with each other, and they do not exert the strength as a structural member when used alone.

The details of the "fiber orientation" are described in embodiment 1 and other related embodiments.

Basic Means K–2

An adhesive bonding process is characterized in fitting the constructional elements together with an adhesive film sandwiched therebetween, periodically repeating applying and removing pressure, and moving the material intermittently and continuously for a small distance at a time between adhesive molds when the pressure is removed.

The application of a continuous adhesive-bonding method enables to vary the curvature of the structural member arbitrarily in mid course, to manufacture a long structural member, and to perform heating and pressing required to bond the structural member without fail.

Applicable materials include a combination of composite materials, or a combination of a composite material and metal.

The actual method is described in embodiment 1.

Basic Means K–3

A method is adopted to apply initial tension to the fibers receiving the load of stress as structural member and straightening the fibers as a means to eliminate fluctuation of the fibers caused during forming of the composite member and create a beam member having high flexural rigidity in a low stress area.

In other words, while preparing constructional elements via basic means K-1, the elements are intentionally formed in a bent state in advance, and in the following adhesive bonding step adopting basic means K-2, the constructional elements that are fitted together are forcibly straightened or forcibly bent to a predetermined curvature during adhesive bonding, so that initial tension is applied to the fibers that receive load as structural member.

Basic means K-3 and the details of fiber orientation for the process are described with reference to embodiment 3.

The effects of the present invention are as follows.

By applying a combination of basic means K-1 and basic means K-2 of the present invention, it becomes possible to ensure a method for forming a structural member being bent with a given curvature, a hollow structural member, a structural member being curved with the curvature varied in the middle, and a torsional structural member with a given torsion.

Furthermore, by further applying basic means K-3 in addition to the above, it becomes possible to provide a method for forming a structural member having a high flexural elastic modulus while minimizing the undulation of fibers caused during the forming process.

BRIEF DESCRIPTION OF THE DRAWINGS

FIG. 3-1 is an explanatory view illustrating the fiber orientations of a flange and a web;

FIG. 3-2 is an explanatory view showing an example in which the web is formed of a unidirectional fiber of 90°;

FIG. 3-3(a) is an explanatory view showing an example in which the web is formed of a fabric composed of +−45' orientation fibers, and FIG. 3-3(b) is an explanatory view showing an example of the actual fiber configuration;

FIG. 5-1 is an overall side view of the heating and pressing step for continuous bonding;

FIG. 5-2 is an explanatory view showing the heating and pressing step for continuous bonding;

FIG. 6-1 is an overall plan view of the heating and pressing step for continuous bonding;

FIG. 6-2 is an explanatory view showing the bending process during continuous adhesive bonding;

FIG. 6-3 is an explanatory view showing the continuous adhesive bonding of a constructional element bent in advance;

FIG. 7-1 is an explanatory view showing a body frame with a hat-shaped cross-section according to a second embodiment of the present invention;

FIG. 7-2 is an explanatory view showing a fiber orientation structure and neutral axis;

FIG. 15-1 is an explanatory view showing an apparatus for manufacturing a structural member in which the curvature can be varied;

FIG. 15-2 is an explanatory view showing an apparatus for manufacturing a structural member in which the curvature can be varied;

FIG. 16 is an explanatory view showing a molding process using an autoclave;

FIG. 20-1 is an explanatory view showing the ADP molding method; and

FIG. 20-2 is an explanatory view showing the ADP molding method.

DETAILED DESCRIPTION OF THE PREFERRED EMBODIMENTS

First Preferred Embodiment of the Present Invention

Structural Member Bent Via a Given Intense Curvature

One preferred embodiment that applies the "basic means K-1" and "basic means K-2" of the present invention in combination is described with respect to a method for manufacturing a structural member bent via a constant intense curvature so as to manufacture a body frame of an aircraft.

Figure 1:
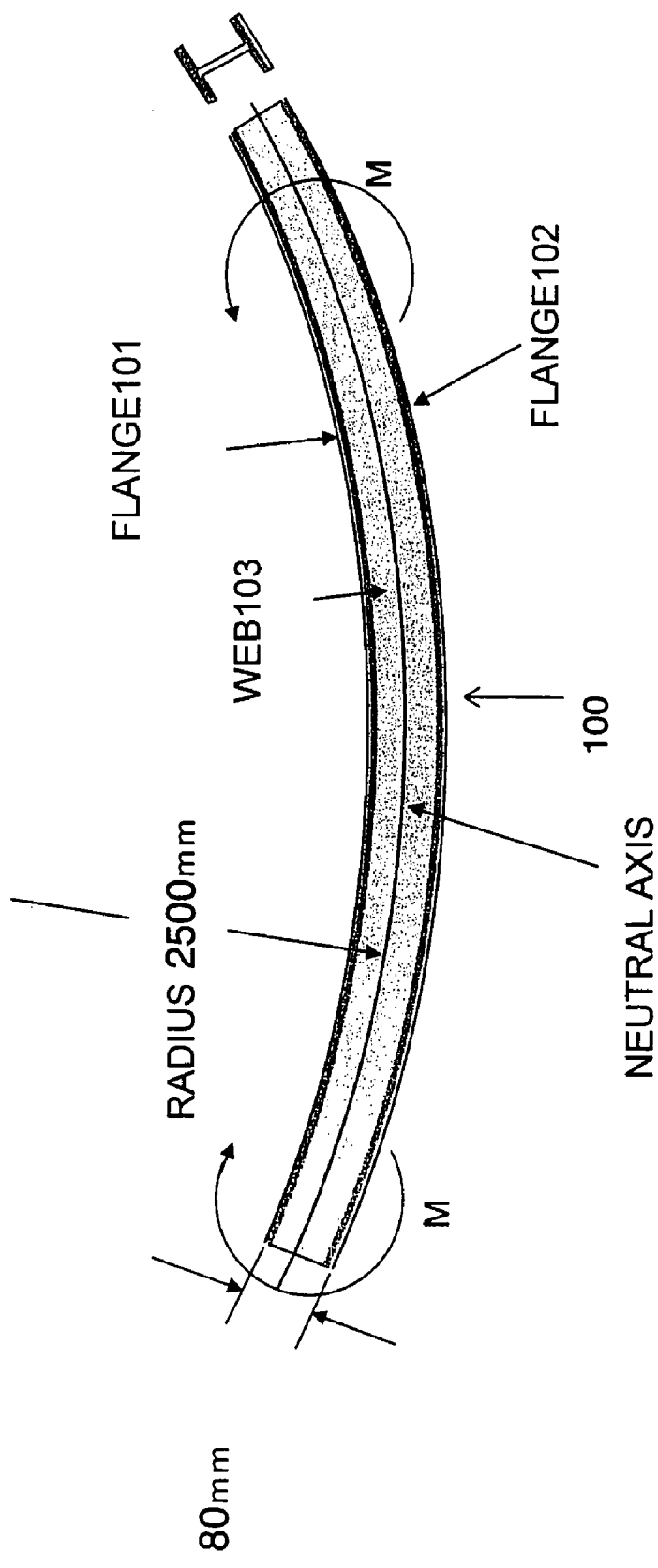
FIG. 1 is an explanatory view showing a structural member bent via a given curvature.

FIG. 1 is a conceptual diagram thereof, wherein the structural member is a structural member 100 with an H-shaped cross-section having a height of 80 mm and a bend radius of 2,500 mm.

In this case, in order to achieve a determined shape by applying plastic deformation, the permanent deformation respectively required for the upper and lower flanges is computed as 1.6%.

Since the high-strength aluminum alloy material used for aircrafts has the characteristics of high tensile and compressive plastic deformation, with the maximum plastic distortion exceeding over 10%, so it is possible to manufacture a straight material having an H-shaped cross-section via extrusion processing, and apply the given curvature via a secondary bending process due to plastic deformation.

However, in the case of a carbon fiber composite material, since the carbon fiber has no plastic deformation, it is impossible to apply a strain as large as 1.6% via a secondary bending process.

If the material is bent by force, the fibers on the tensile side does not expand, so the fibers on the compressive side must be deformed by 3.2%, but actually, the material is buckled or creased since the fibers do not shrink.

Since buckled fibers and creased fibers do not endure the required tension and compression, the fabricated member cannot be utilized as a structural member.

When the structural member 100 used as a beam member receives a downward bending moment M, an upper flange 101 is subjected to compressive stress, a lower flange 102 is subjected to tensile stress, and a web 103 is subjected to shear stress.

Figure 2:
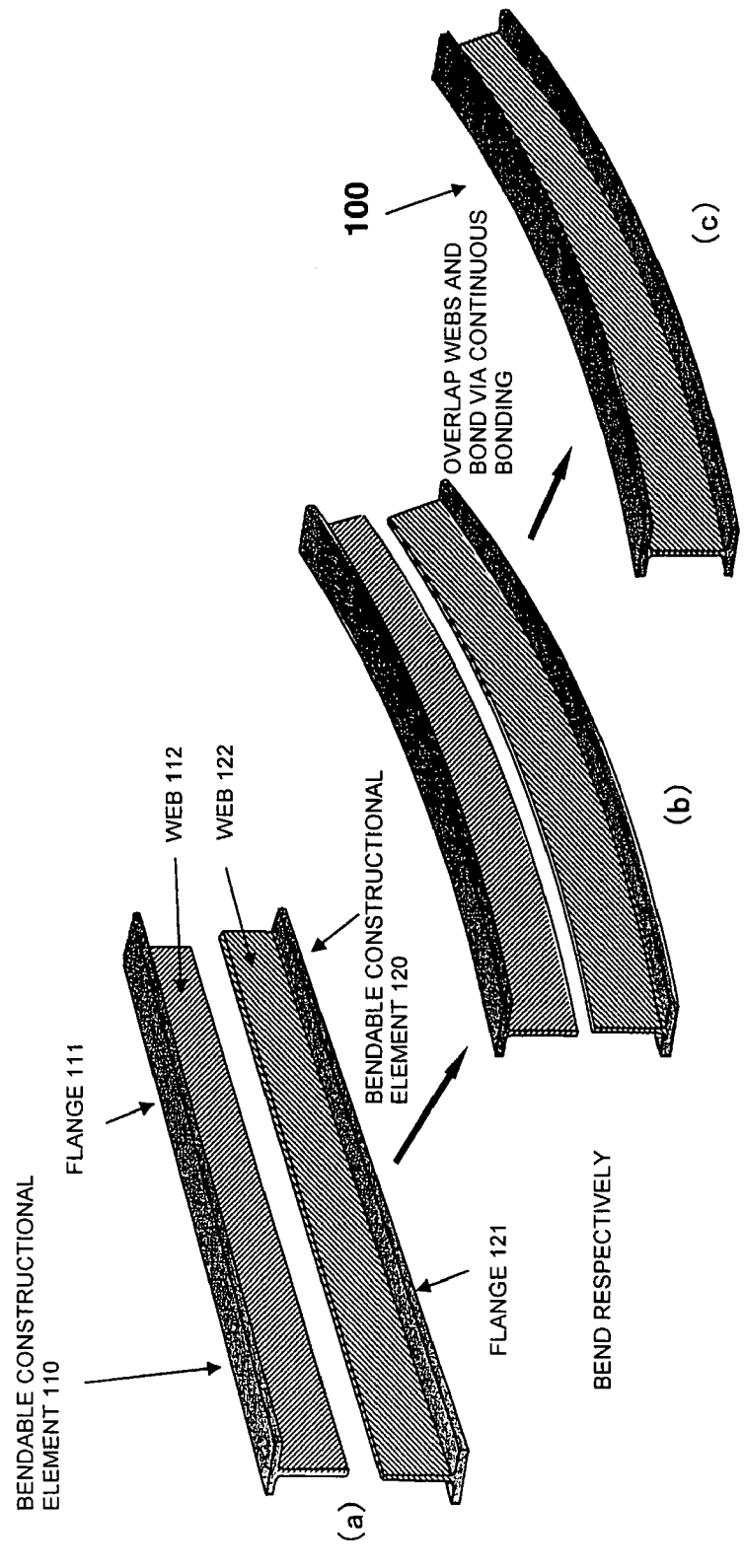
FIG. 2 is an explanatory view showing a method of manufacturing a structural member bent via a given curvature.

Thus, in order to fabricate a structural member 100 having an H-shaped cross-section, the "basic means K-1" of the present invention is applied to fabricate two types of T-shaped structural members 110 and 120 in advance as shown in FIG. 2, and the continuous adhesion of "basic means K-2" is performed to bond the two members together to fabricate a structural member having high strength and high rigidity.

Since the T-shaped constructional elements 110 and 120 have fiber architectures capable of being bent to the required curvature in their independent state, they are bent and simultaneously adhesively-bonded.

Figures 2, 3:
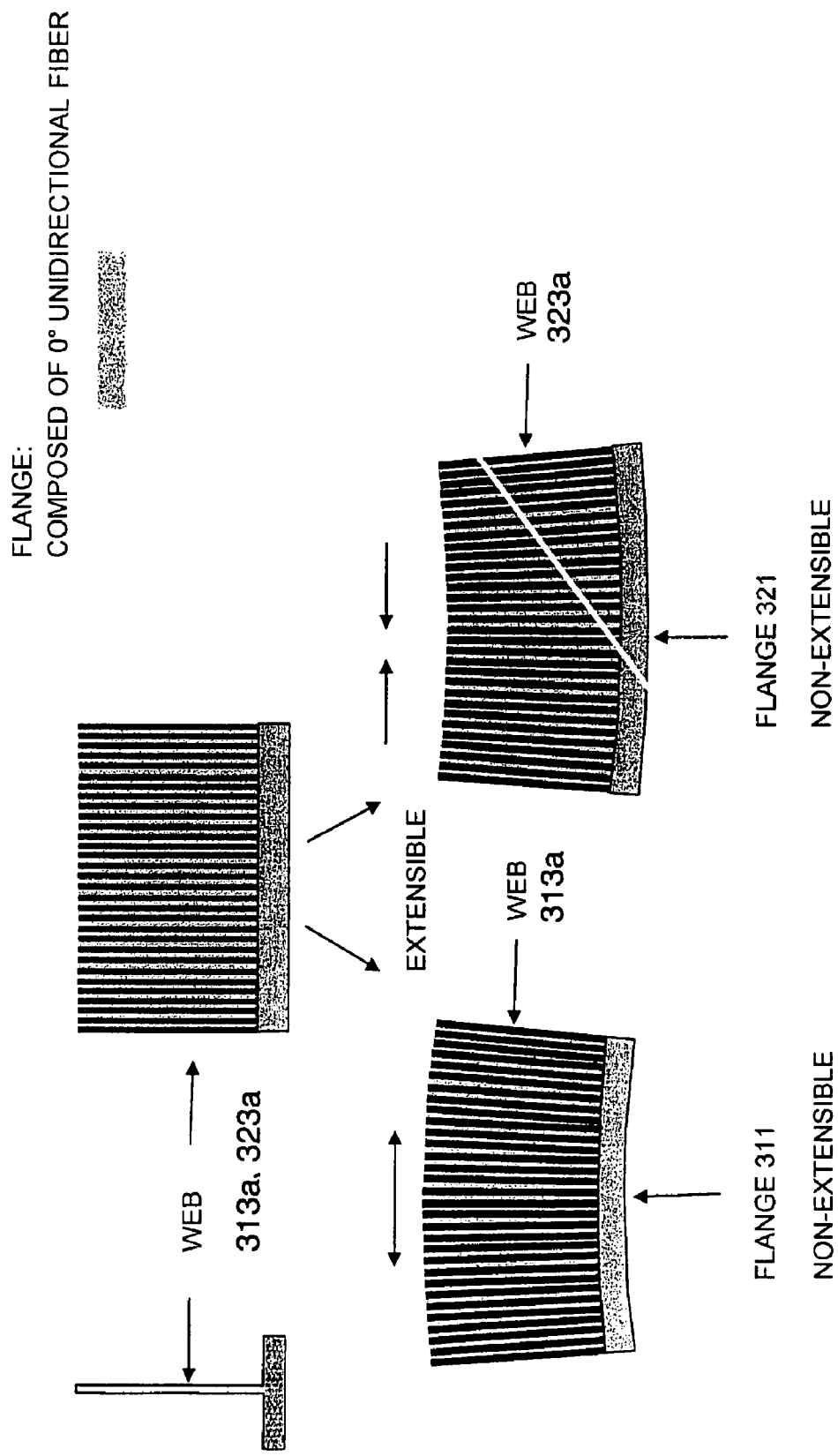
Figure 3:
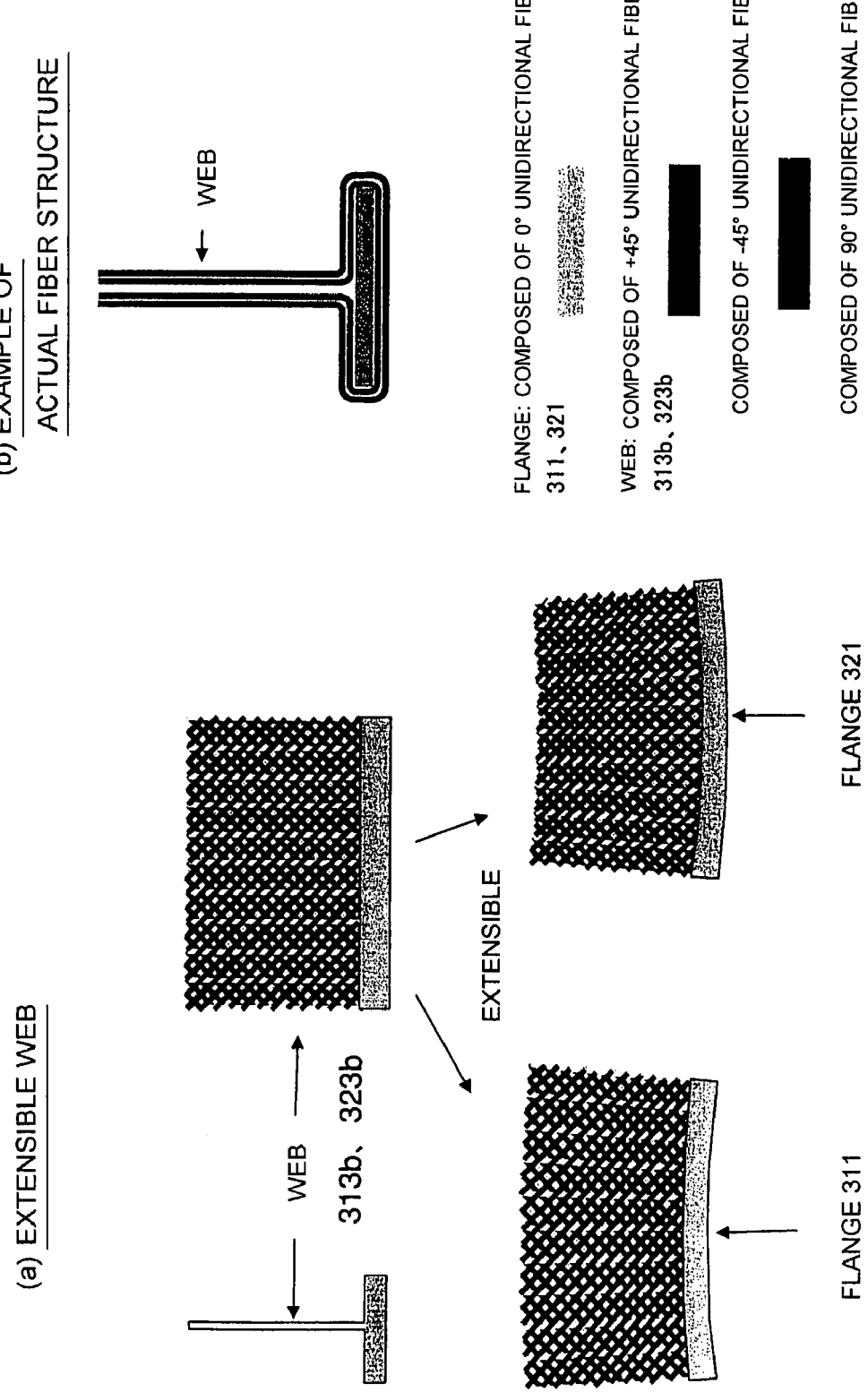

The fiber architecture is described in detail hereafter with reference to FIG. 3-1.

The T-shaped constructional elements 110 and 120 have basically the same shape and same structure, but they can have different shapes and structures according to the load and shape requirements of the structural member 100.

In order to exert high degree of elasticity and strength in order to oppose to the tensile strength or compressive strength (axial tension), flanges 111 and 121 are respectively composed mainly of a unidirectional fiber (UD fiber) pulled in one direction at 0° with respect to the axial direction, as shown in FIG. 3-1(b).

Actually, it is further necessary to arrange fibers arranged at +−45° orientations in order to transfer shear force between fibers so that the UD fibers receive uniform stress.

The web portions 112 and 122 receiving shear force of the beam member is composed of +−45° orientation fibers in order to exert high shear elastic modulus, which are bent and fitted together so as to transfer shear force to the flange.

The constructional elements 110 and 120 prepared as above are fitted together with adhesive films sandwiched at the web portions, and then are bent and adhesively-bonded together to form a structural member 100 with an H-shaped cross-section in a manner described in detail later. The reason why the members are bendable will be described hereafter.

As shown in FIG. 3-2, on the condition that webs 313a and 323a are composed of unidirectional fibers of 90°, since fibers with a 90° orientation do not show any resistance in the axial direction, the fabricated constructional element can be bent easily centering around a neutral axis positioned at the center of the flange, but it cannot transfer axial force caused by shear force. Thus, the webs are composed of +−45' orientation fibers. Expansion and contraction is also possible when fibers are oriented at +−45°.

If the curvature is intense, as shown in FIG. 3-3A, the webs 313b and 323b are composed of a unidirectional fiber layer of +−45°, a unidirectional fiber layer of −45°, and a unidirectional fiber of 90° interposed between the layers, according to which the degree of freedom of expansion and contraction at the ends of webs 313b and 323b are increased. An example of the actual fiber arrangement is shown in FIG. 3-3B.

When considering the strength of the web, on the condition that the structural member 100 receives a concentric load of 1000 Kg, the "shear flow" in the web is computed to be 12.5 Kg/mm since the web height is 80 mm, and on the condition that the web thickness composed of four layers is 0.8 mm, the applied stress is computed to be 15.6 Kg/mm$^2$, which can be sufficiently endured by carbon fiber prepreg composed of 45° fiber.

Such constructional elements 110 and 120 having T-shaped cross-sections composed of carbon fiber composite material can be manufactured via an ADP method disclosed in patent document 1, but they can also be manufactured via a manufacturing method using an ordinary autoclave or a pultrusion method.

The above description illustrates the application of "basic means K-1" of the present invention.

Next, we will describe the application of "basic means K-2" of the present invention.

Figure 4:
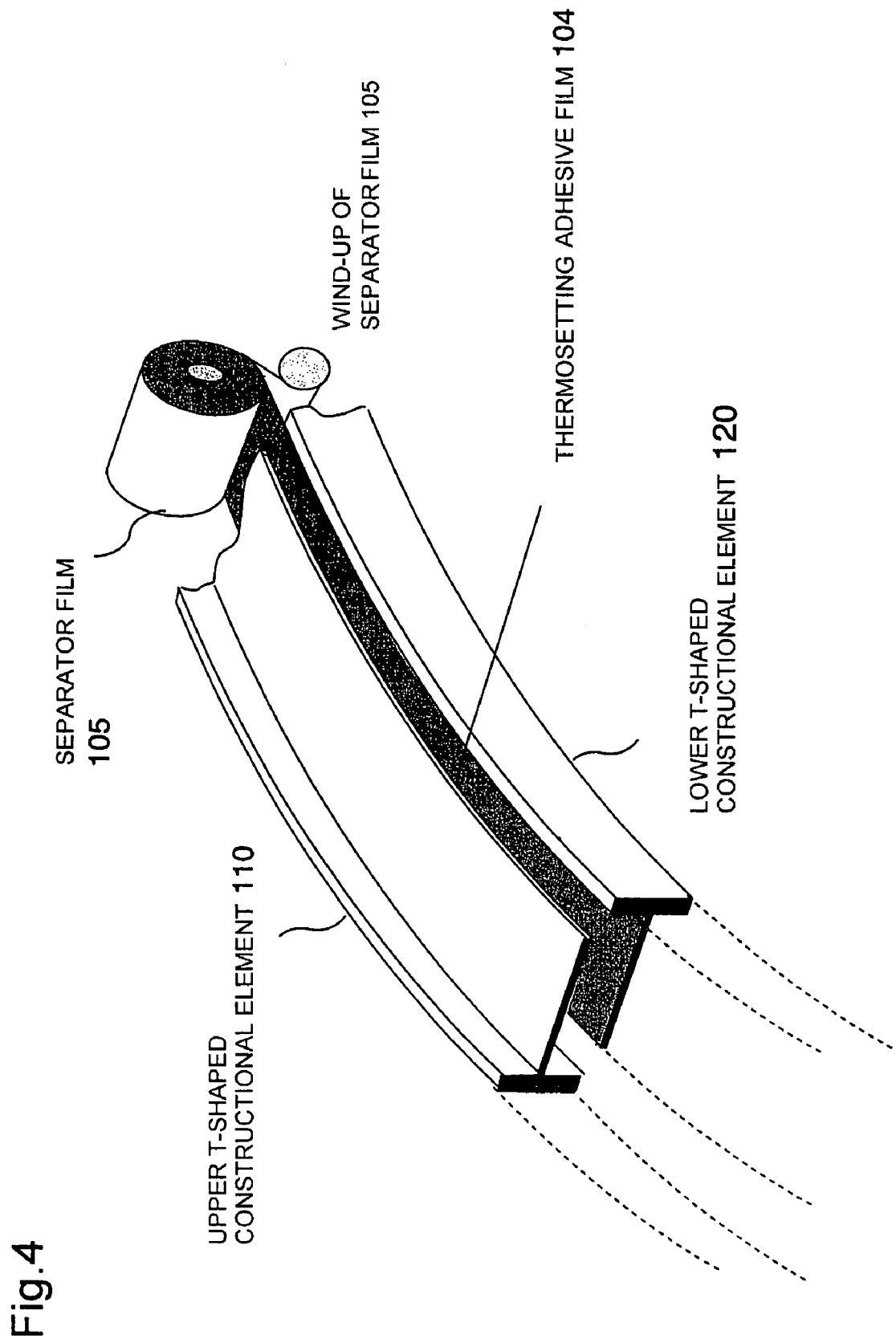
FIG. 4 is an explanatory view showing the preparation for adhesive bonding.

As shown in FIG. 4, in a preparation process, the T-shaped constructional elements 110 and 120 being in a bent state are fitted together, with an adhesive film 104 sandwiched between the webs.

The film-type adhesive 104 is an epoxy-based thermosetting adhesive, which is cut into required widths in a partially-cured state, and wound with a separator film 105 into a roll and provided. The separator film 105 is wound up before adhesion.

Figures 1, 5:
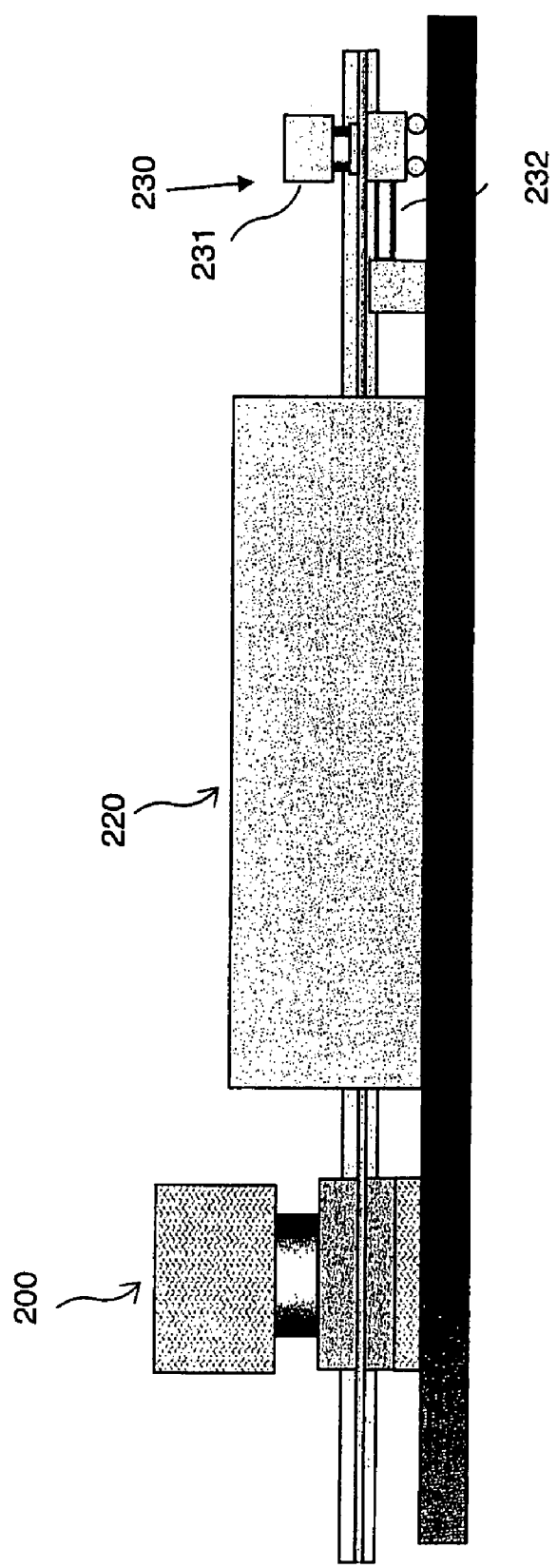
Figures 2, 5:
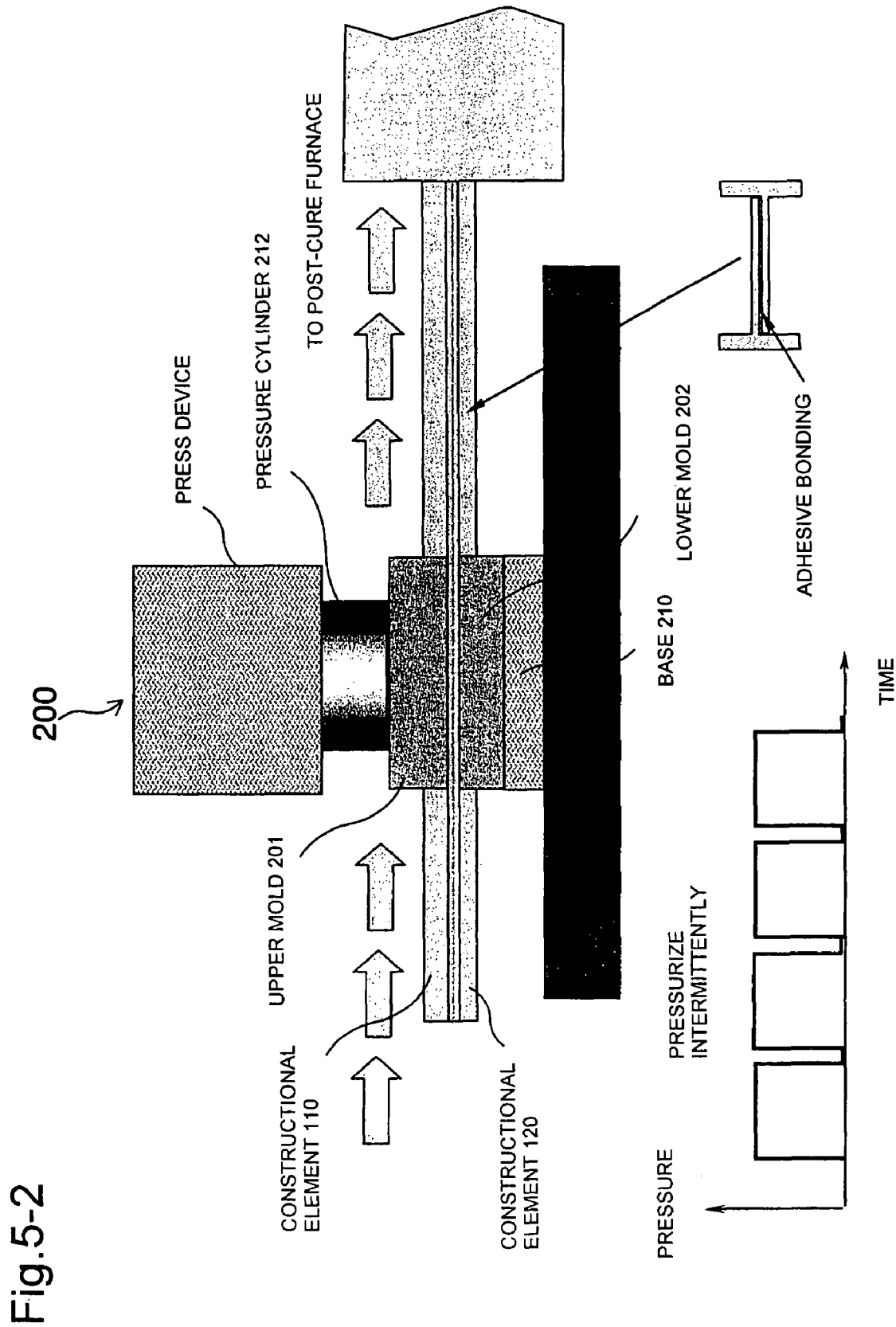

FIGS. 5-1 and 5-2 show the heating and pressing processes.

An apparatus 200 for heating/pressing the material is disposed on the left side of FIG. 5-1, which has a structure of a general small-sized thermoforming press, for intermittently heating/pressing the material.

The apparatus disposed at the center of FIG. 5-1 is a post-cure furnace 220 for completely curing the adhesive, in which the material is moved from left to right to completely cure the adhesive.

The post-cure furnace will not be necessary if a resin having a short cure time is selected, but from the viewpoint of cure reliability, a resin having a long cure time is selected purposely.

The apparatus at the right end of FIG. 5-1 is an apparatus 230 for moving the material intermittently corresponding to a pressure removal cycle.

In the apparatus 230, a pressurizing cylinder 231 for applying friction moves the material by moving repeatedly via a transfer cylinder 232.

The fabricated structure member is cut into desired lengths by a saw.

As shown in FIG. 5-2, the mold of the heating/pressurizing apparatus 200 is divided into an upper mold 201 and a lower mold 202, each having a heating device incorporated therein.

The lower mold 202 is fixed on top of a base 210, and the upper mold 201 is moved up and down via a pressure cylinder 212 for intermittently pressing the material.

A pressurizing pressure of 3 Kg/cm$^2$ is enough, and the pressurizing cycle repeats applying pressure for 30 seconds and removes pressure for 2 seconds.

In the depressurization step, the material is moved for approximately 30 mm, so the speed of movement is 30 mm in 32 seconds (approximately 3.4 m/h).

The heating temperature is determined by the thermosetting property of the adhesive resin, which is in the range of 120 to 180° C.

The adhesive resin having been cured for approximately 30% melts temporarily then starts curing in the heating/pressurizing mold, but when it exits the mold, the curing has progressed and has reached a stable state.

Figures 1, 6:
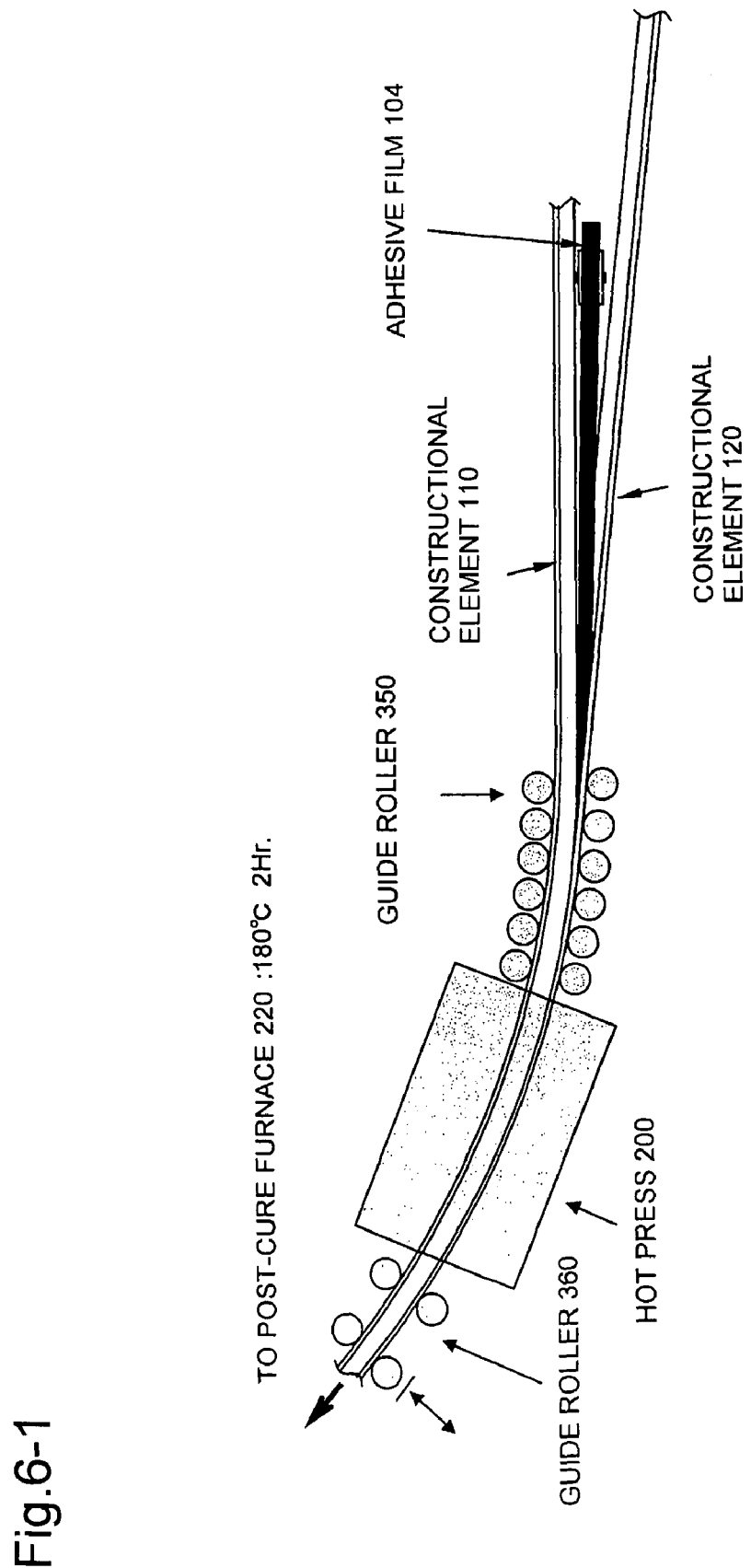
Figures 2, 6:
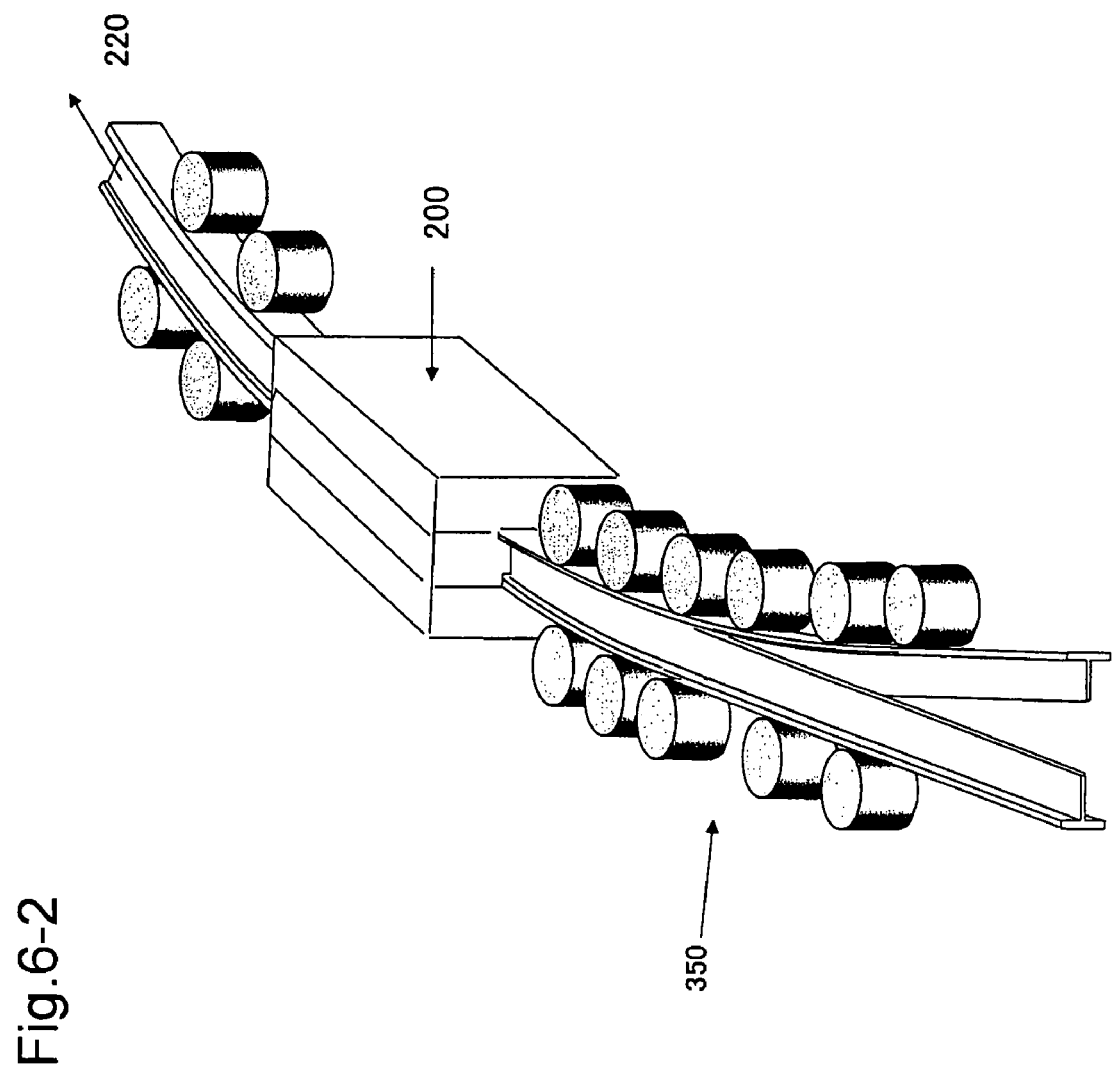
Figures 3, 6:
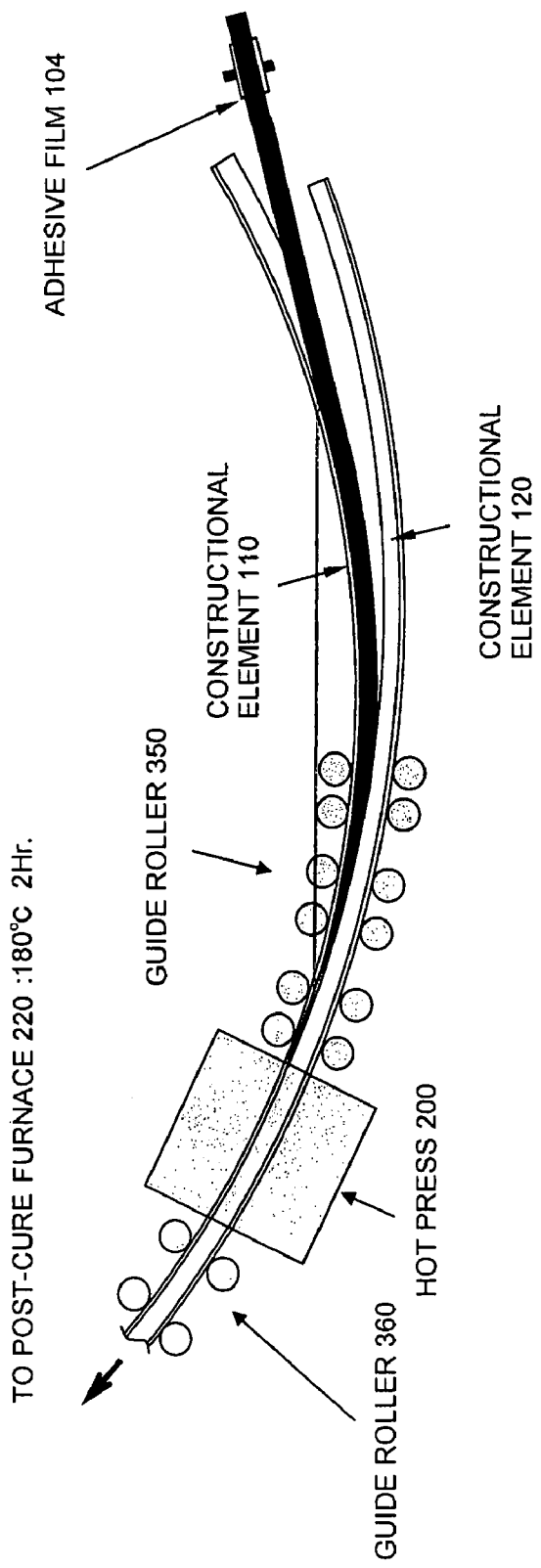

As described above, in order to create an H-shaped structural member 100 curved with a given curvature, as shown in FIGS. 6-1 and 6-2, the first and second constructional elements 110 and 120 to be adhesively-bonded are passed through a guide roller 350 and overlapped, then bent with a given curvature and introduced to the hot press 200.

In another possible method, as shown in FIG. 6-3, the respective constructional elements 110 and 120 are manufactured in a bent state and introduced to the hot press 200.

The above description illustrates the application of the "basic means K-2" of the present invention.

As described, the bendable constructional elements 110 and 120 do not have strength and rigidity as a structural member in their independent states, but by assembling the elements, they constitute a structural strength member having a high flexural rigidity.

The above method describes an example using thermosetting resin having high reliability, but it can also be applied to the forming of a structural member using thermoplastic resin.

When a prepreg material composed of thermoplastic resin is used for the plurality of pre-molded constructional elements, the re-heating for adhesion causes the elements formed of thermoplastic resin to be partially melted, so it becomes possible to omit adhesives, however, since the hardness of thermoplastic resin is low, it has a drawback in that the force binding the fibers is weak, ant it is impossible to exert the compression strength characteristics of the constructional elements sufficiently.

Second Embodiment of the Present Invention

Figures 1, 7:
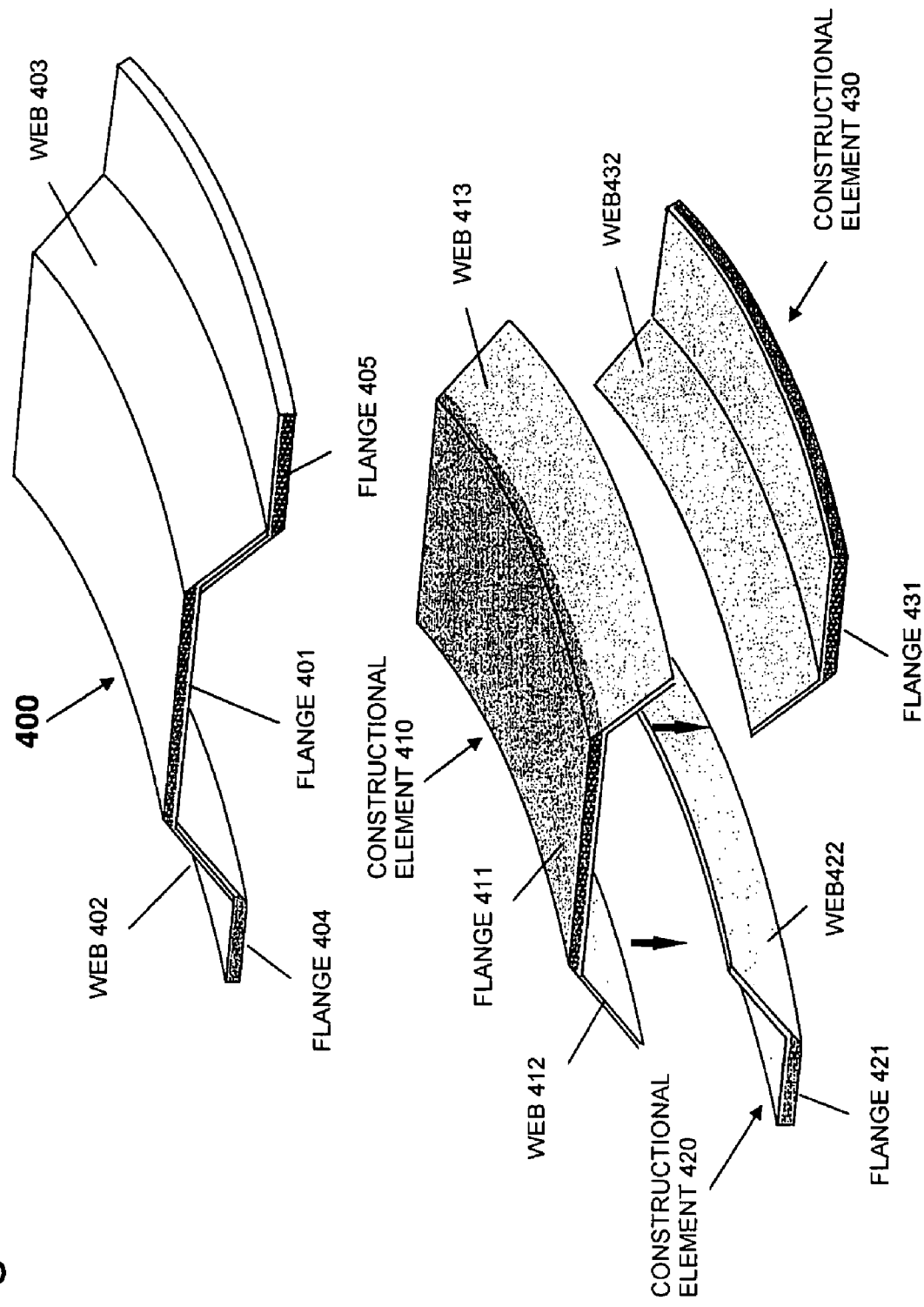

A second embodiment of the present invention is illustrated in FIG. 7-1, related to a method for manufacturing a curved beam 400 of a carbon fiber composite material curved with a given curvature and having a hat-shaped cross-section (hat section) to be applied for example to a body frame of an aircraft.

In order to manufacture a constructional element 400 having a hat section, the "basic means K–1" of the present invention is applied to form three constructional members, a channel-shaped constructional element 410 and two constructional elements 420 and 430 having an angled cross-section, and then the "basic means K–2" is applied to perform adhesive bonding.

Each of the constructional elements 410, 420 and 430 are manufactured via an ADP method, which is formed in a long and bent state, and prepared to be bonded.

When a bending moment is applied to a beam member 400 having a hat section, sides 401, 404 and 405 constituting the flange of the beam member 400 is subjected to tensile/compressive stress, and sides 402 and 403 constituting the web is subjected to shear force.

Therefore, as shown in FIG. 7-1, the channel-shaped constructional element 410 is composed of a side 411 forming the flange of the hat section beam member 400 which is mainly formed of 0° UD fabric so as to exert high strength and elastic modulus resisting against the tensile force or compressive force, and sides 412 and 413 constituting the web of the beam member are formed solely of +45' and −45° orientation UD fibers so as to exert high shear elastic modulus against shear force.

The 45° orientation fibers constituting the web are placed on the 0° UD fabric of the flange portion.

Since sides 412 and 413 constituting the web are formed using only +45° and −45° UD fibers, the neutral axis of the constructional element 410 is positioned at the center of thickness of the flange 411 composed of 0° fibers, so that no stress is applied to the flange even when the element is bent after the prepreg materials are laminated, and a component can be formed via bending without creating creases.

With the same object, angle-shaped constructional elements 420 and 430 are composed of sides 421 and 431 constituting the flange of the beam member also mainly composed of 0° UD fibers, as shown in FIG. 7-1, and sides 422 and 432 constituting the web of the beam member solely composed of +45° and −45° UD fibers, so that the neutral axis is positioned at the center of the flanges 421 and 431. Refer to FIG. 7-2.

The 45° orientation fibers constituting the web are overlapped on the 0° UD fiber of the flange portion, as shown in FIG. 7-2.

The "basic means K–2" of the present invention is applied as the method for performing adhesive bonding via heat and pressurization.

Figure 8:
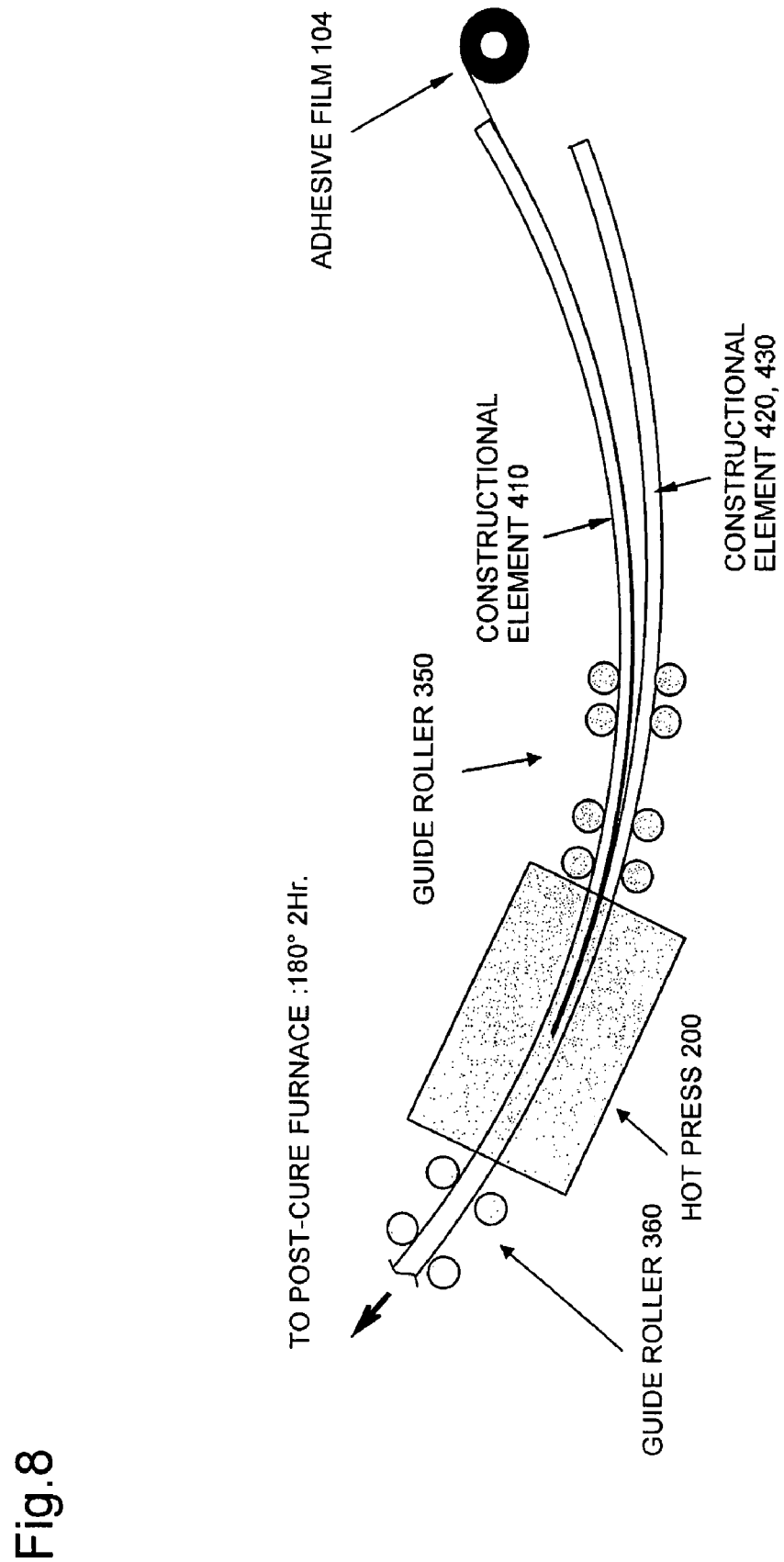
FIG. 8 is an explanatory view showing the adhesive bonding of a body frame having a hat-shaped cross-section.

FIG. 8 illustrates a means for performing adhesive bonding continuously to form a long beam member having the cross-sectional structure shown in FIG. 7-1 and a given curvature.

As described, the constructional elements 410, 420 and 430 manufactured by applying the basic means K–1 can be bent in their independent states, but they do not exert the required strength of a structural member. However, when the constructional elements are adhesively bonded via basic means K–2, they constitute a structural member having high flexural rigidity and strength.

Figure 9:
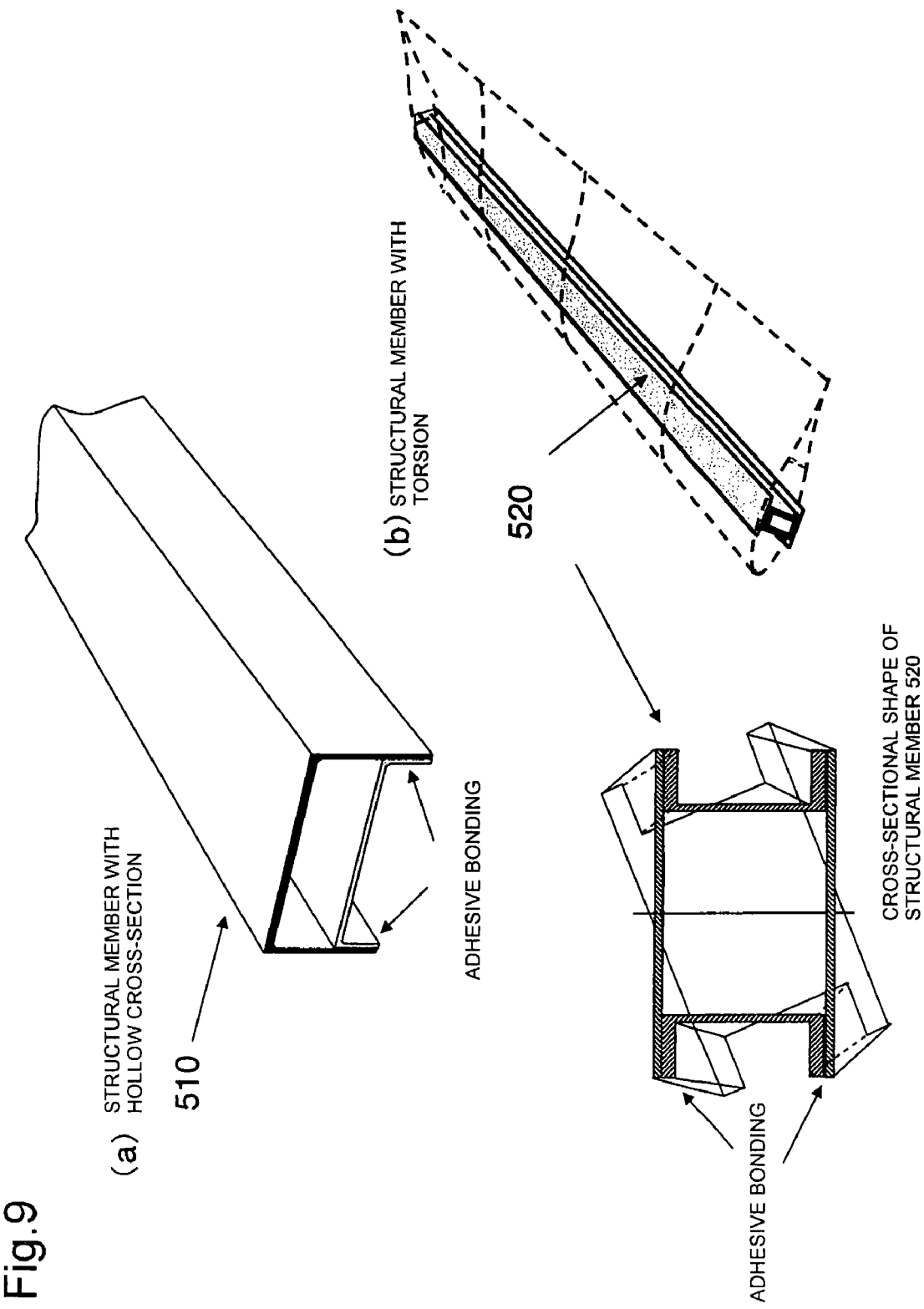
FIG. 9 is an explanatory view showing other application examples.

Other application examples of the combination of basic means K–1 and basic means K–2 include the fabrication of a structural member 510 having a hollow cross-section as shown in FIG. 9A and the fabrication of a structural member 520 of a windmill blade having a torsion with a given torsional ratio as shown in FIG. 9B.

Third Preferred Embodiment of the Present Invention

Figure 10:
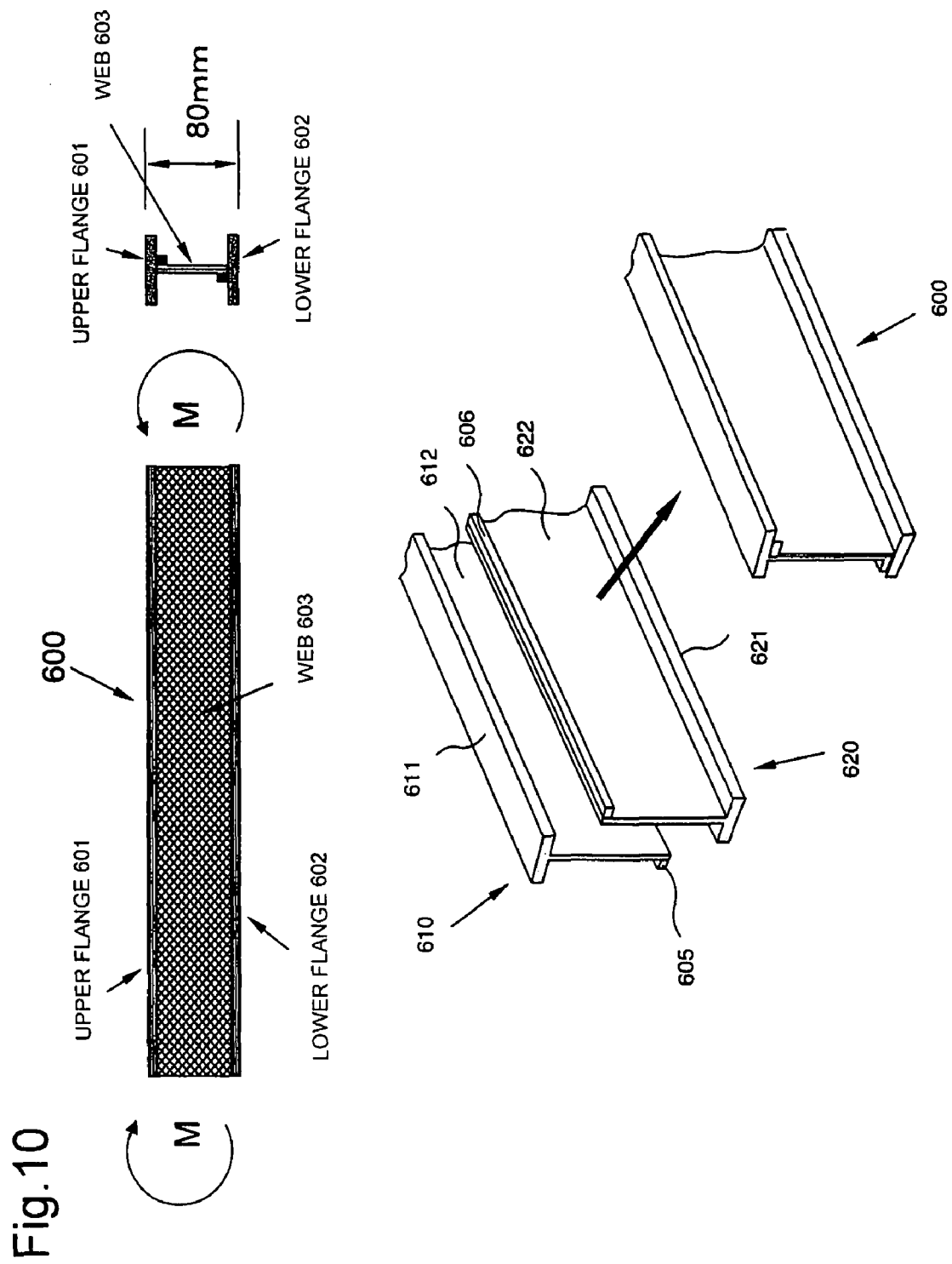
FIG. 10 is an explanatory view showing the structure of a beam member having pre-tension applied thereto.

FIG. 10 illustrates as the third embodiment of the present invention an example of a beam having applied initial tension to the group of fibers in the flange portion of an H-shaped structural member so as to eliminate fluctuation and improve the bending elastic modulus in a low stress range.

The present embodiment is described as a straight structural member 600, but it can also be applied to a bent structural member.

The basic structure of the fiber is the same as embodiment 1, as shown in FIG. 10.

Figure 13:
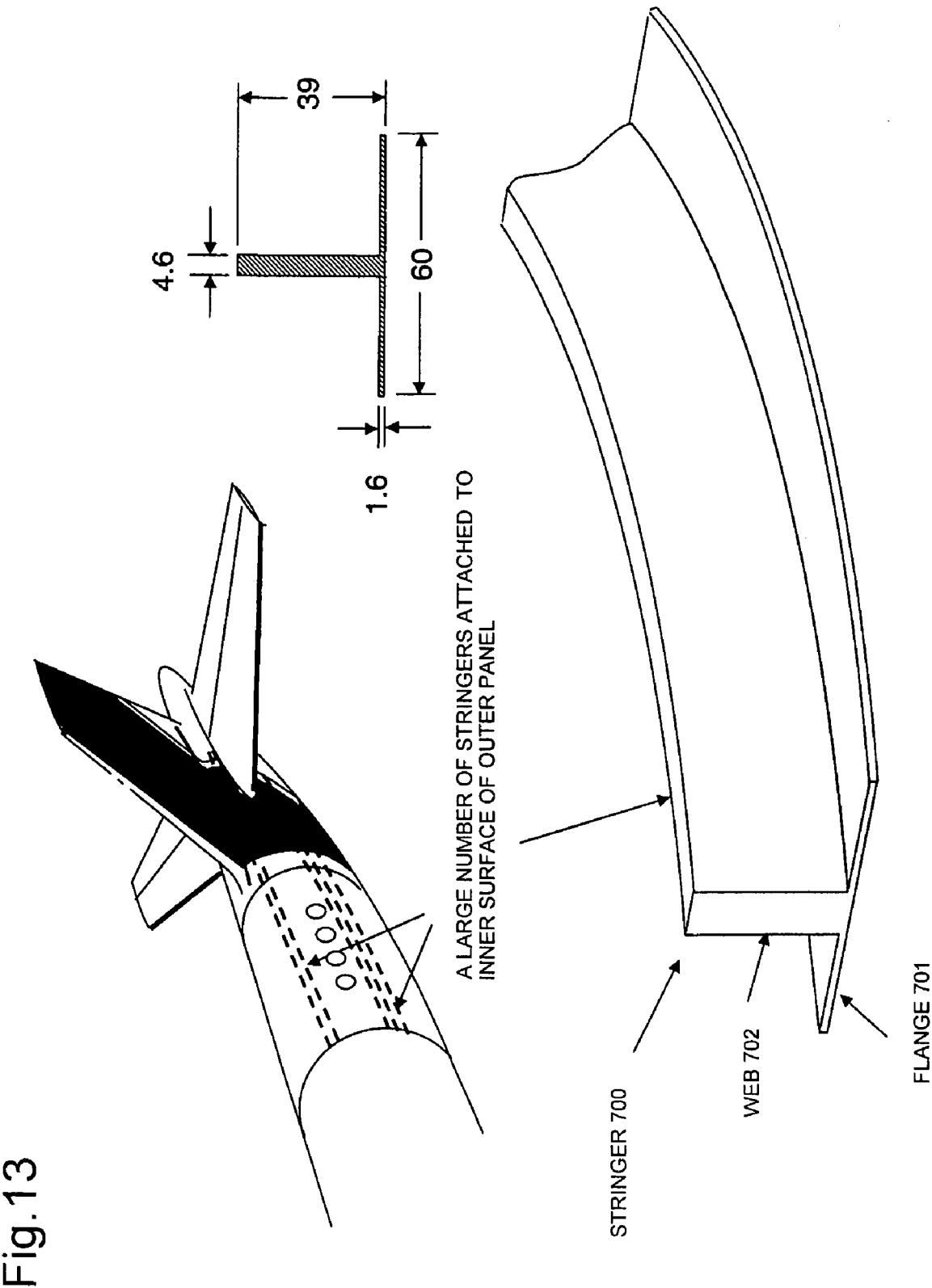
FIG. 13 is an explanatory view showing a rear body stringer.

The initial tension should merely apply displacement required to pull and straighten the undulating carbon fiber, so that the required amount of displacement is as small as approximately 0.1 to 0.2%, as can be seen from FIG. 13.

Similar to the aforementioned embodiments, the fibers constituting an upper flange 601 and a lower flange 602 of a constructional element 600 is mainly composed of 0° orientation fibers with respect to the axis.

The fibers constituting a web 603 are only orientated at +45° and −45° with respect to the axis, but in order to transfer force, they are bent and overlapped on the flanges.

The constructional element 600 is composed of two T-shaped constructional elements 610 and 620.

At the ends of webs 612 and 622 of the T-shaped constructional elements 610 and 620 are arranged compressed members 605 and 606 compressed so as to apply initial tension to flanges 611 and 621.

Figure 11:
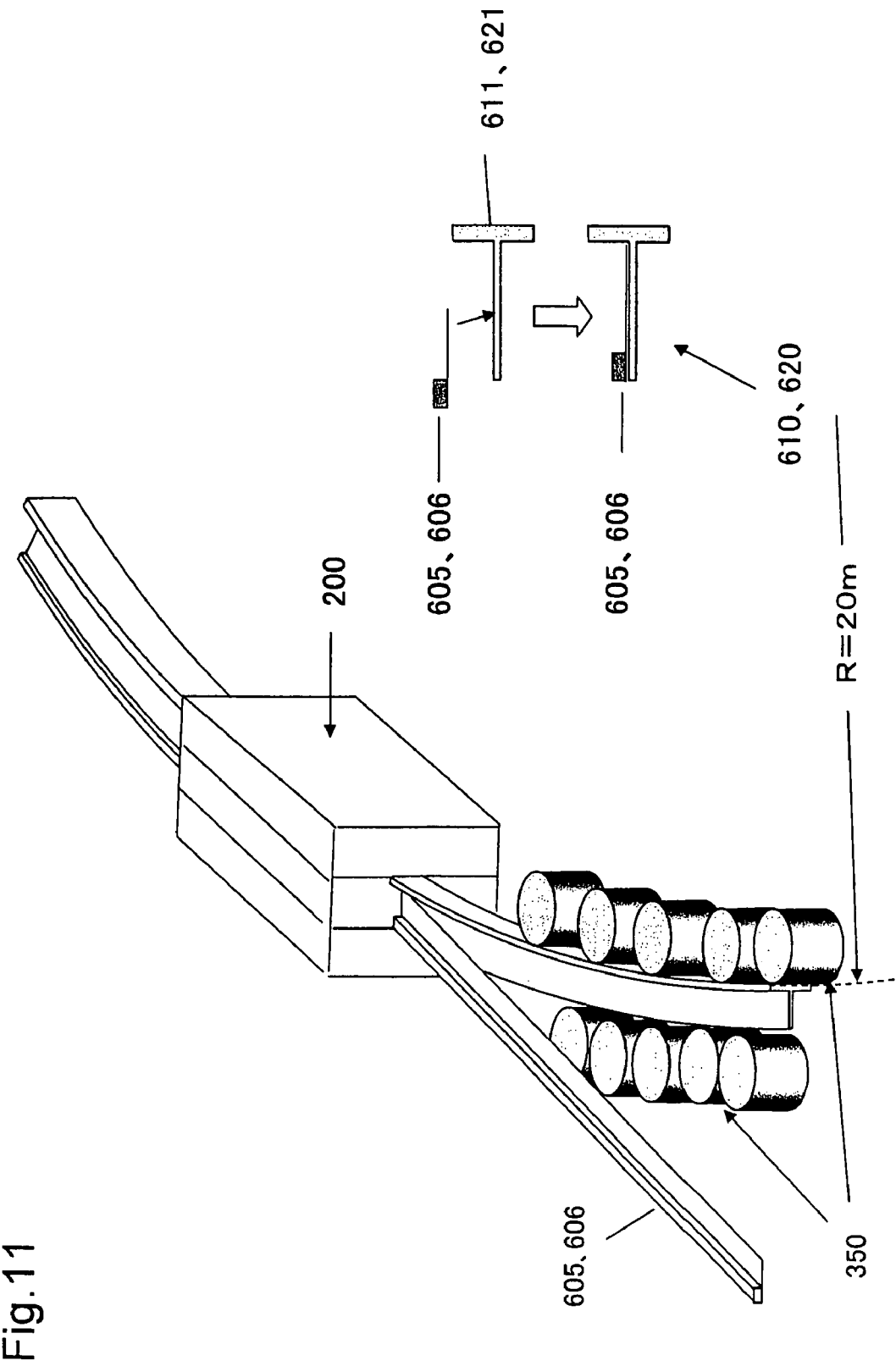
FIG. 11 is an explanatory view showing a step for bonding a compressed member to the constructional element.

In other words, T-shaped constructional elements 610 and 620 are formed in advance, which are bent while having compressed members 605 and 606 bonded thereto, as shown in FIG. 11.

The compressed members 605 and 606 are composed by overlapping a bundle of UD fibers having a 0° orientation with fibers having +45° and −45° orientations.

It is also a good idea to use metal rods formed of titanium alloy or the like instead of the fiber bundle.

A material having such cross-sectional shape and fiber architecture is manufactured via ADP method, and at this time, the material is characterized in that it is bent with a determined curvature, as shown in FIG. 11.

If the fibers must be extended by 0.2% in order to apply initial tension to the group of fibers to eliminate fluctuation, on the condition that the height of the structural member 600 is 80 mm, the curvature: bend radius applied to form T-shaped constructional elements 610 and 620 independently is computed to be 20 m.

In this state, the constructional elements 610 and 620 are respectively provided with flexural rigidity.

Figure 12:
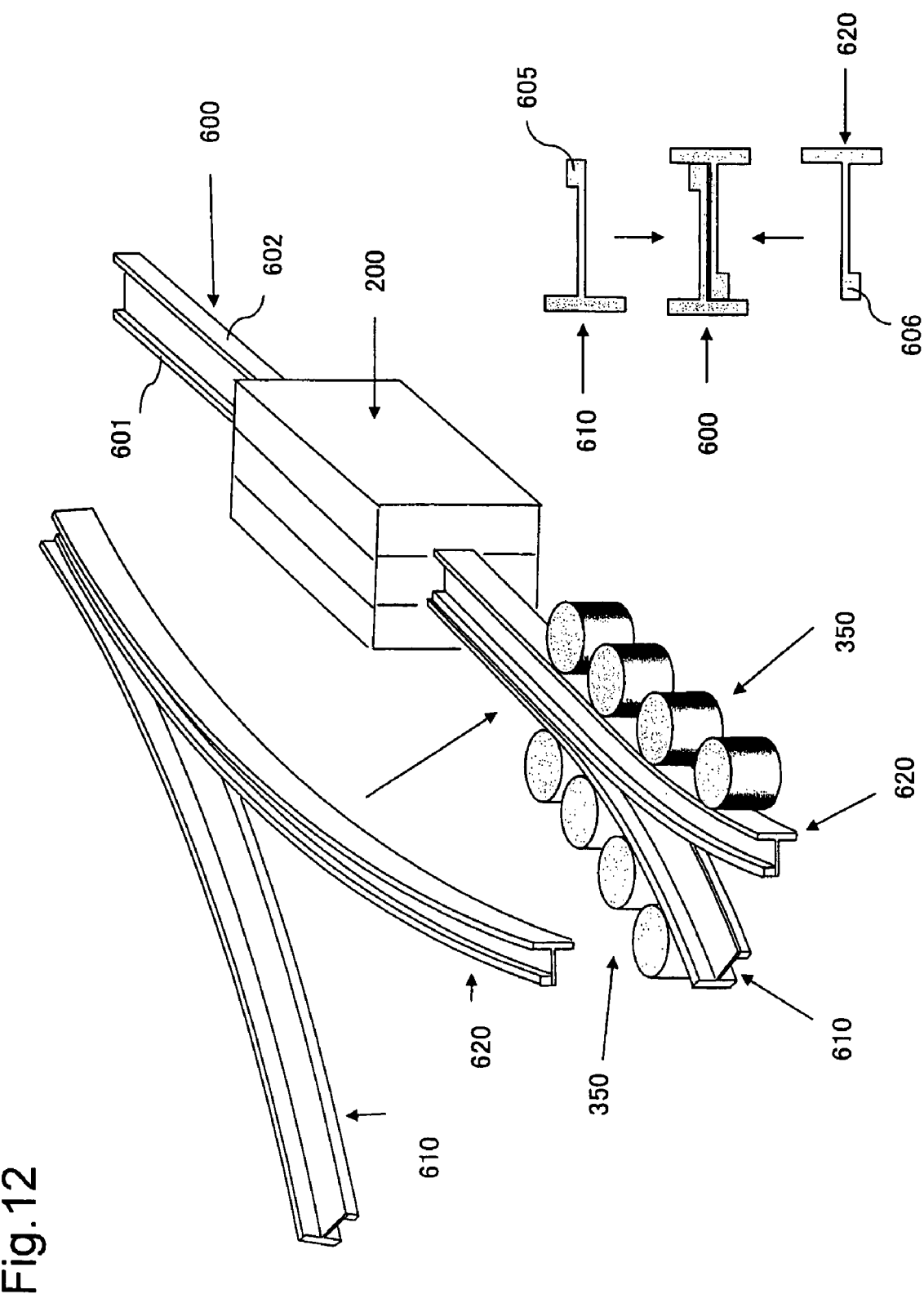
FIG. 12 is an explanatory view showing a step for straightening a curved constructional element and bonding the same.

Next, as shown in FIG. 12, the constructional elements 610 and 620 are fitted together, and at the same time, straightened via a roller 350 and adhesively-bonded in a mold press 200.

The adhesive bonding method is the same as that of embodiment 1, but with a longer heating/pressing time.

The flange portions 601 and 602 of the beam member fabricated as above have initial tension applied thereto.

The compressed members 605 and 606 arranged at the ends of the web have applied thereto compressive stress that matches the initial tension applied to the flange. The internal stresses of the respective members are balanced so that the completed structural member becomes straight. In other words, the internal stresses of the constructional elements 610 and 620 are controlled so that the completed structural member becomes straight.

Figure 18:
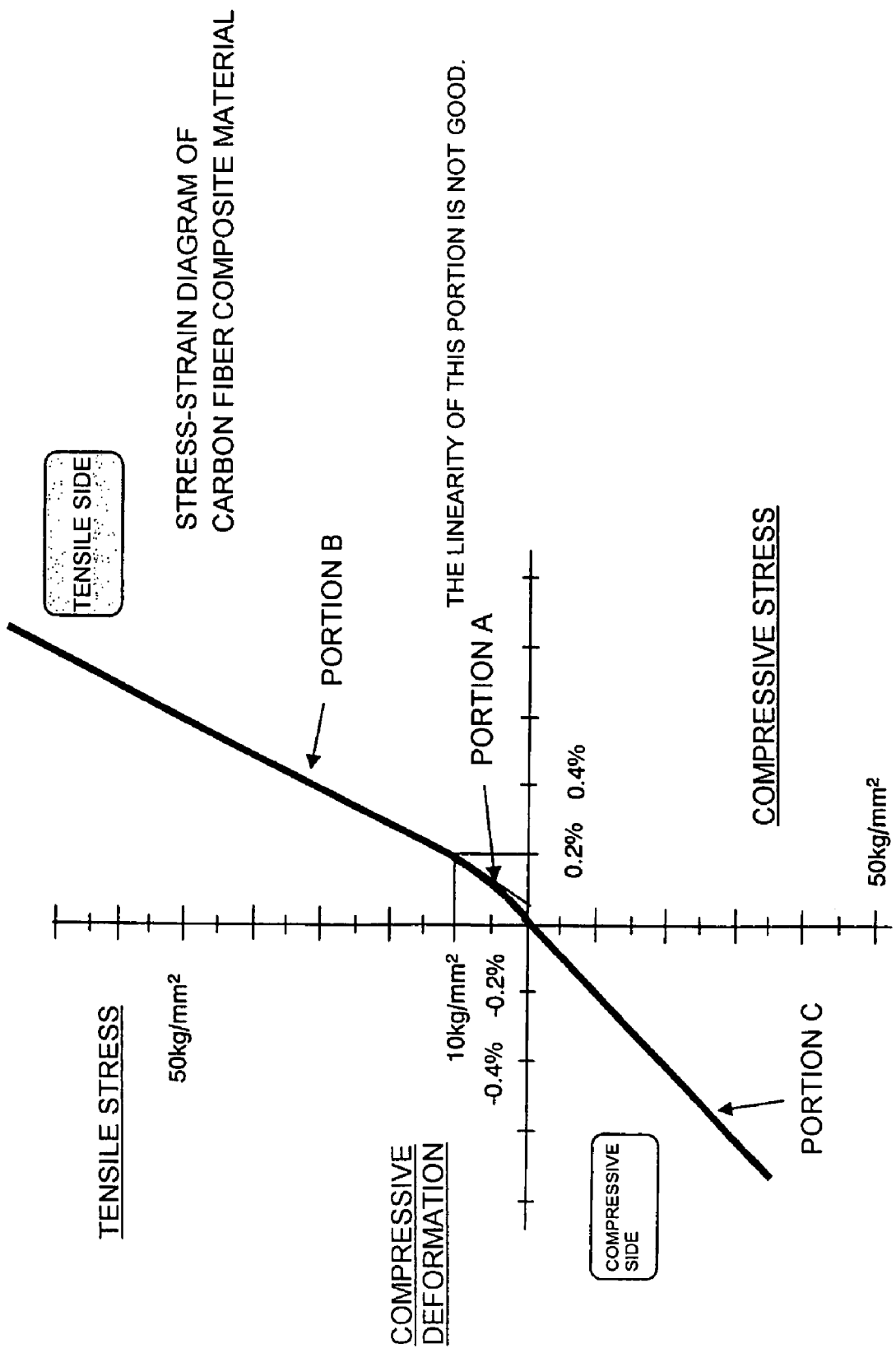
FIG. 18 is a stress-strain diagram of the case in which the fibers have "fluctuation"
Figure 19:
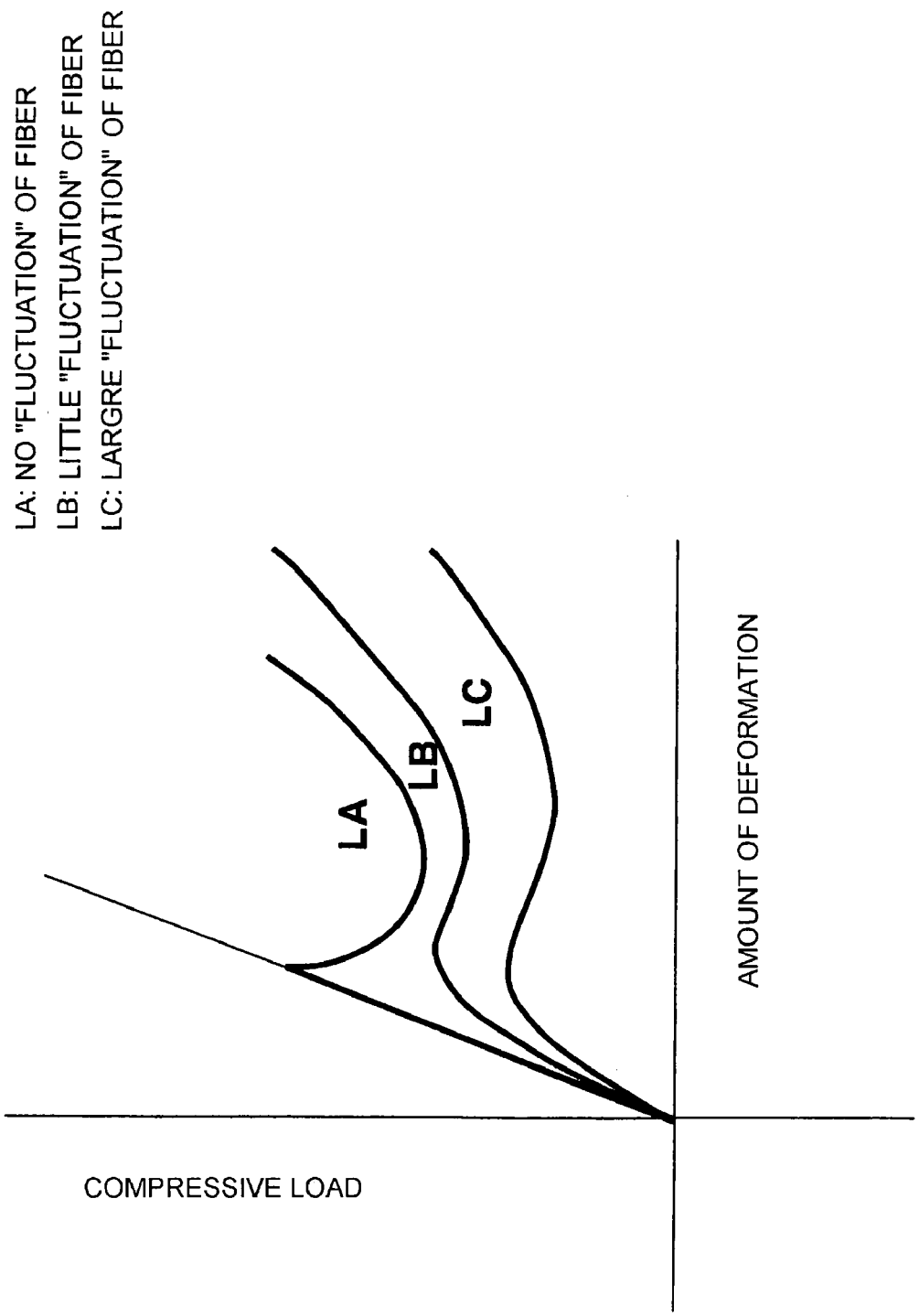
FIG. 19 is an explanatory view showing the degree of "fluctuation" and buckling load of the fibers.
Figures 1, 20:
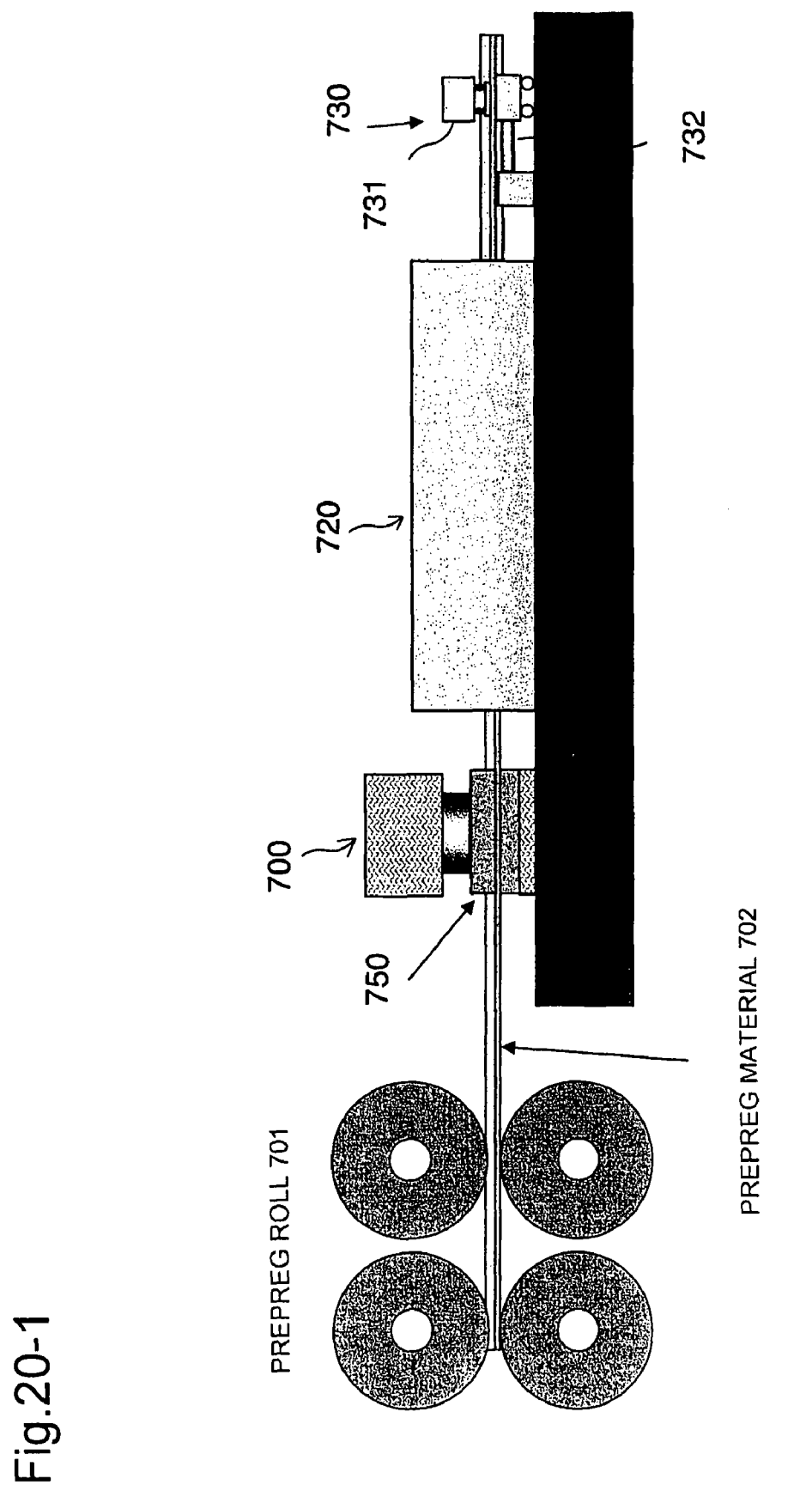
Figures 2, 20:
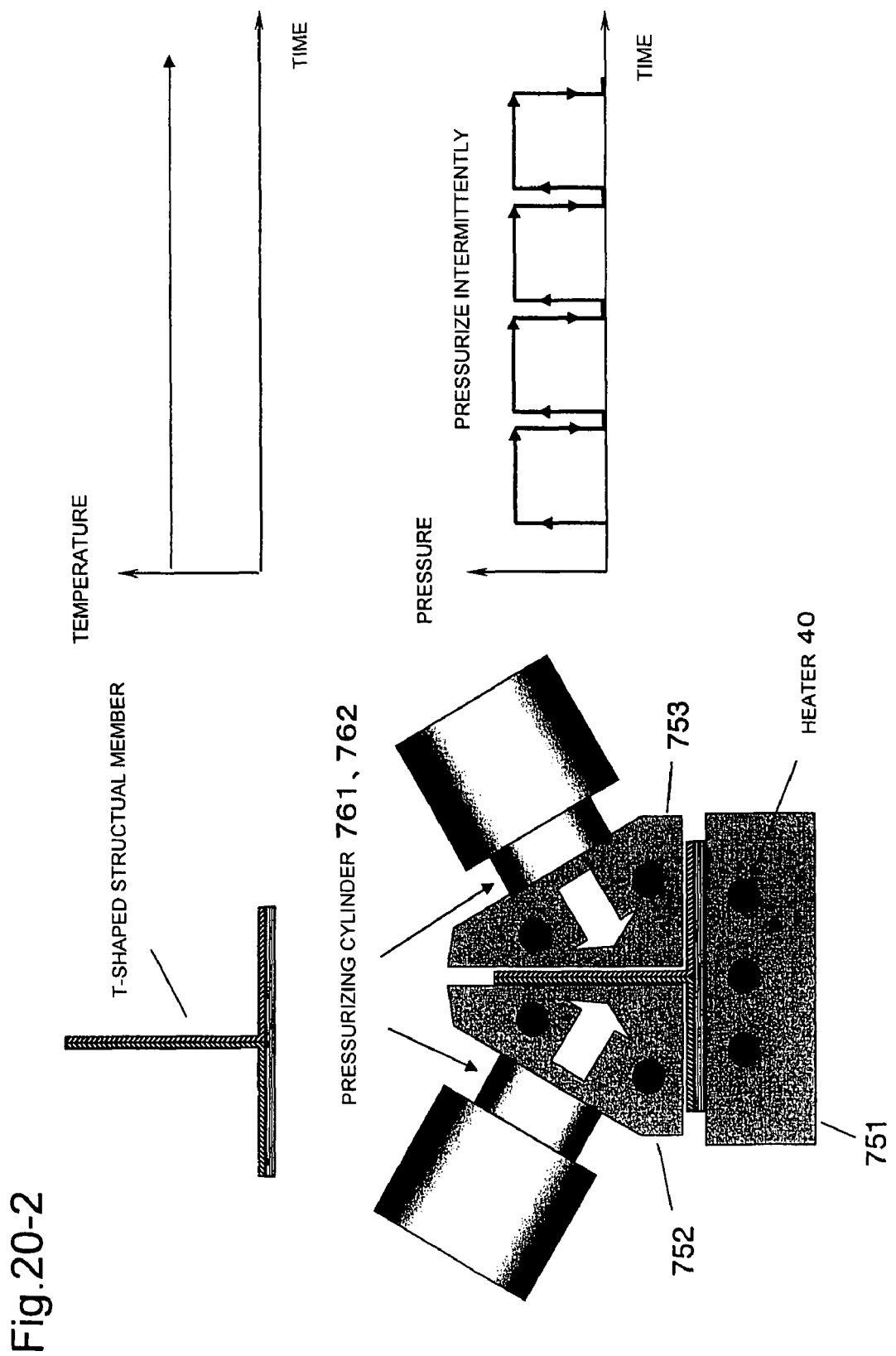

With reference to FIG. 18, when there is no application of initial tension, when a stress of 100 MPa (10.2 Kg/mm$^2$) is caused by the application of a bend moment, an elongation of 0.2% is generated, so that the elastic modulus is computed to be 50 GPa (5100 Kg/mm$^2$). On the other hand, when an initial tension corresponding to the stress of 100 MPa (10.2 Kg/mm$^2$) is applied, the increase of elongation with respect to the increased stress of 100 MPa (10.2 Kg/mm$^2$) is merely 0.1%, so that the elastic modulus is computed to be 100 GPa (10200 Kg/mm$^2$), which is double the former value.

As described, the present member exerts a high flexural rigidity in a low stress range.

The object of applying initial tension is to eliminate fluctuation of the group of fibers and to straighten them, so the initial tension should preferably be as small as possible.

This method is also applicable in improving the flexural rigidity of a bent structural member.

Fourth Embodiment of the Present Invention

The fourth embodiment of the present invention describes a method for manufacturing a stringer of a rear fuselage of an aircraft.

As shown in FIG. 13, a fuselage stringer 700 of an aircraft functions to receive load of tensile/compressive force (especially compressive force) that the outer panel of the body receives, so that force is transferred from a flange 701 to a web 702. Therefore, the flange 701 of the stringer 700 must endure shear force, while the web 702 must endure tensile/compressive force.

Since the rear fuselage of an aircraft is narrowed toward the tail, the stringers supporting the outer panel of the body are formed as structural members with curvature, and the curvatures of each member differ according to the mounting position of the members.

In the prior art, the metallic rear fuselage stringer is formed by manufacturing a straight stringer and providing via secondary plastic deformation process the required curvatures corresponding to the mounting positions. However, if carbon fiber composite materials are used, as described, it is impossible to perform a secondary plastic deformation process to bend the members to have determined curvatures.

Therefore, the method described in the fourth embodiment of the present invention is for applying various curvatures to the stringers at the time of manufacture to complete the members. The members used in an aircraft are all identified via part numbers, so that the members are each bent with a different curvature according to part number, and the curvatures are determined by the position of the stringers.

Figure 14:
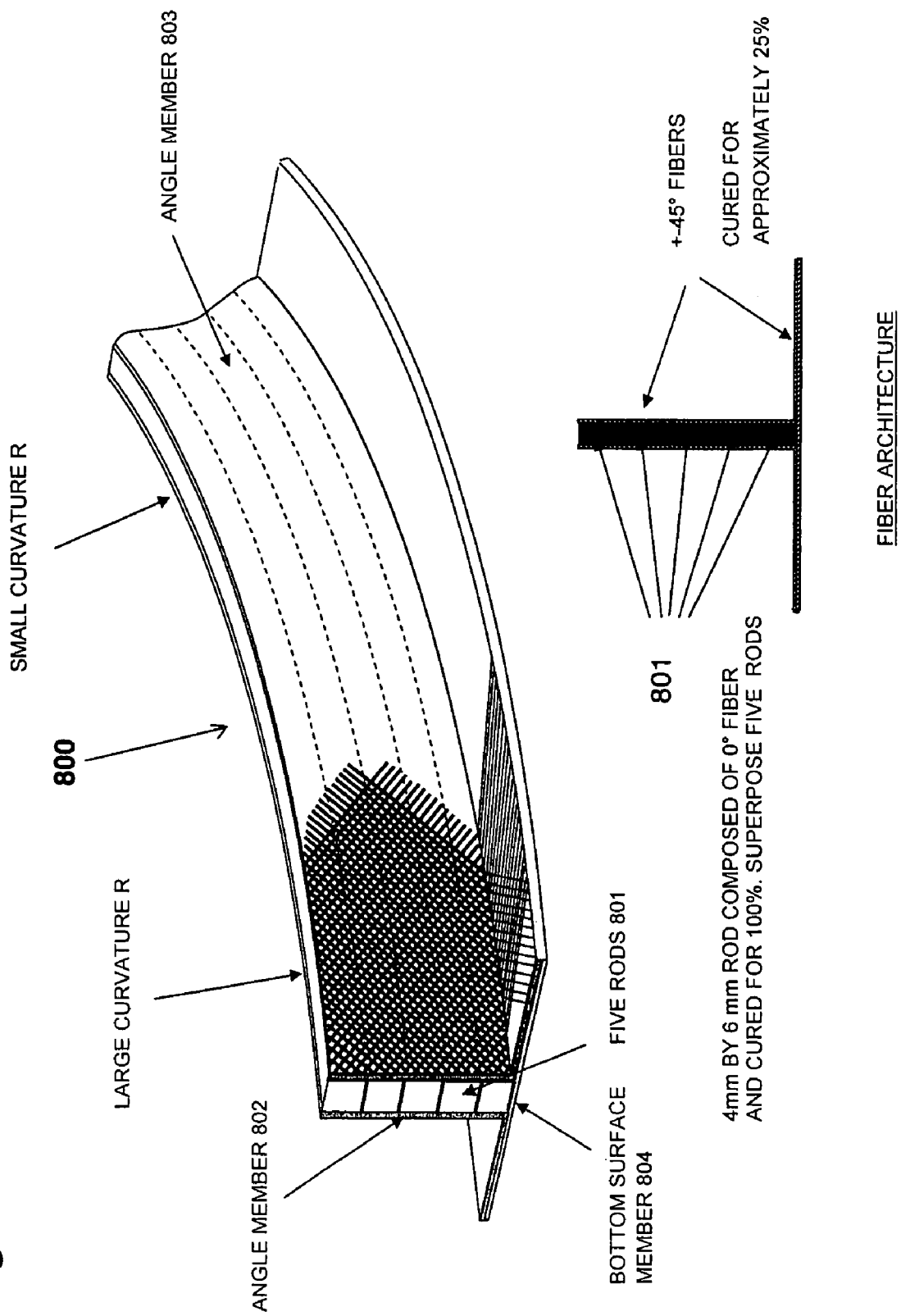
FIG. 14 is a conceptual view of the structure of a curved stringer.

The cross-section of the stringer is T-shaped, as illustrated in FIG. 13, but unlike the aforementioned embodiments, since the web receives load of tensile/compressive force, the fiber structure basically differs, which is illustrated in FIG. 14.

A stringer 800 is fabricated by piling five 4 mm by 6 mm rectangular rods 801 formed of UD fiber, applying angle members 802 and 803 formed of 45° fibers on both sides thereof, and performing adhesive-bonding while bending the whole structure. If necessary, it is possible to arrange a bottom surface member 804 thereto.

Figures 1, 15:
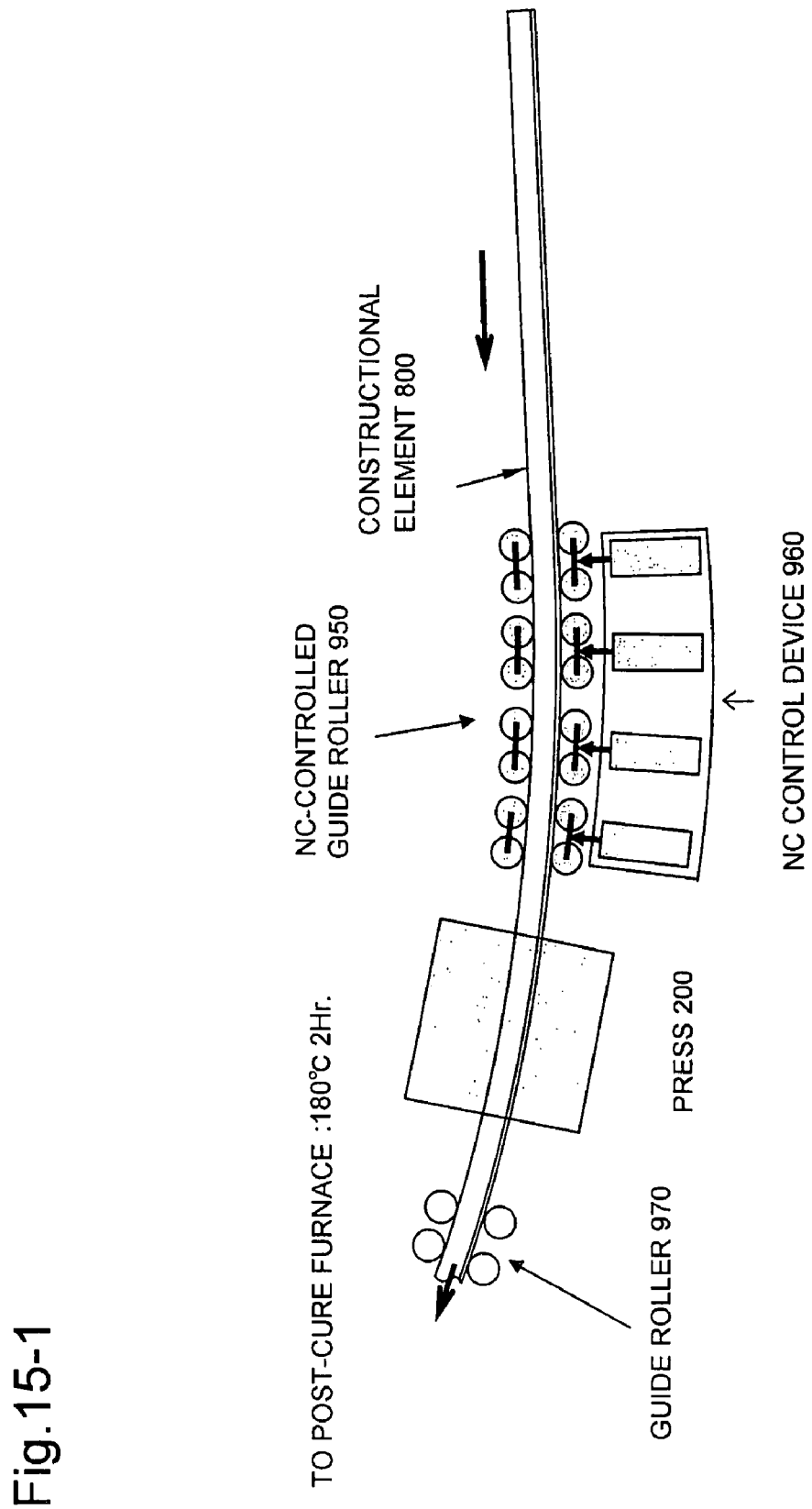
Figures 2, 15:
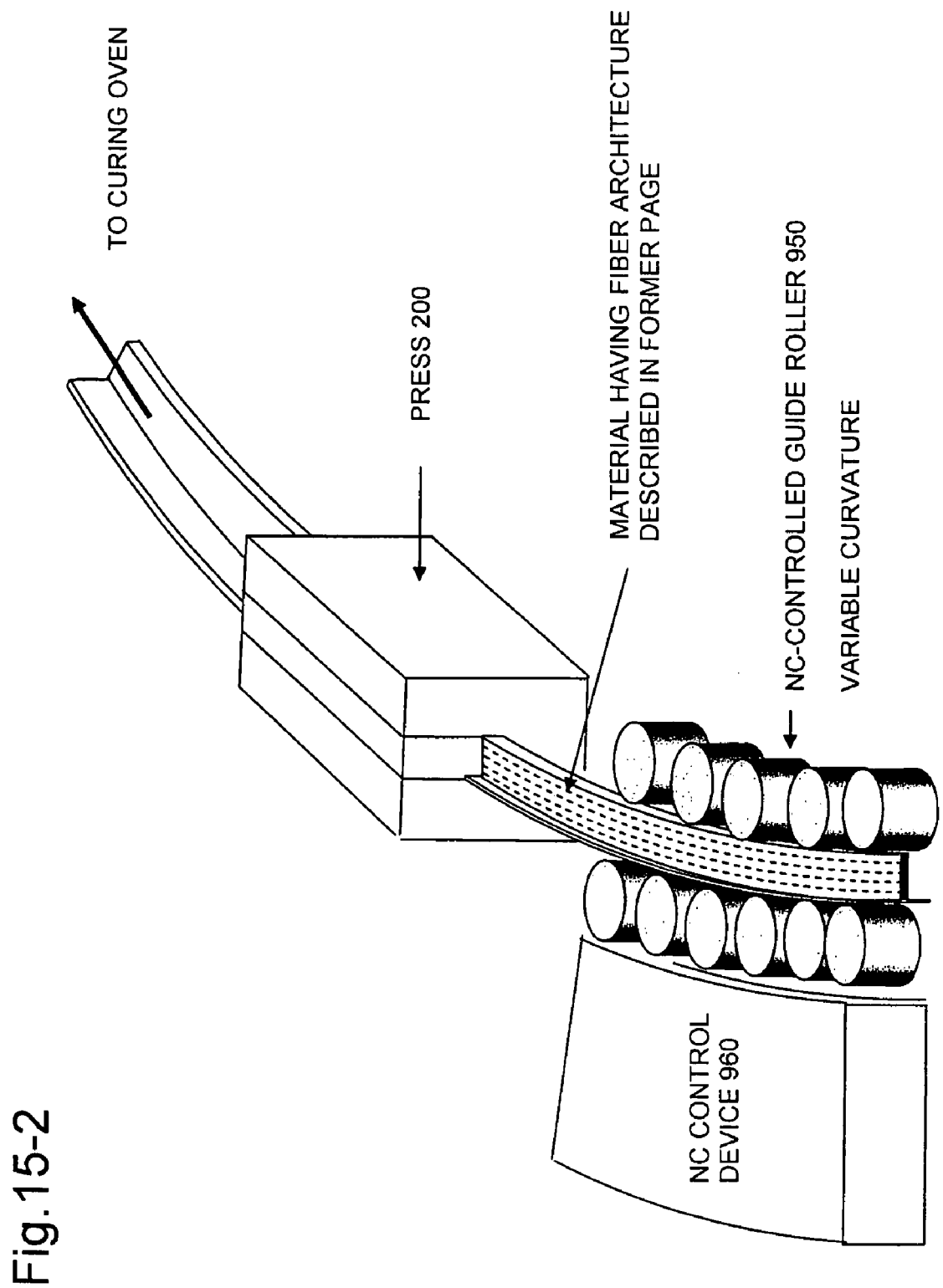
Figure 17:
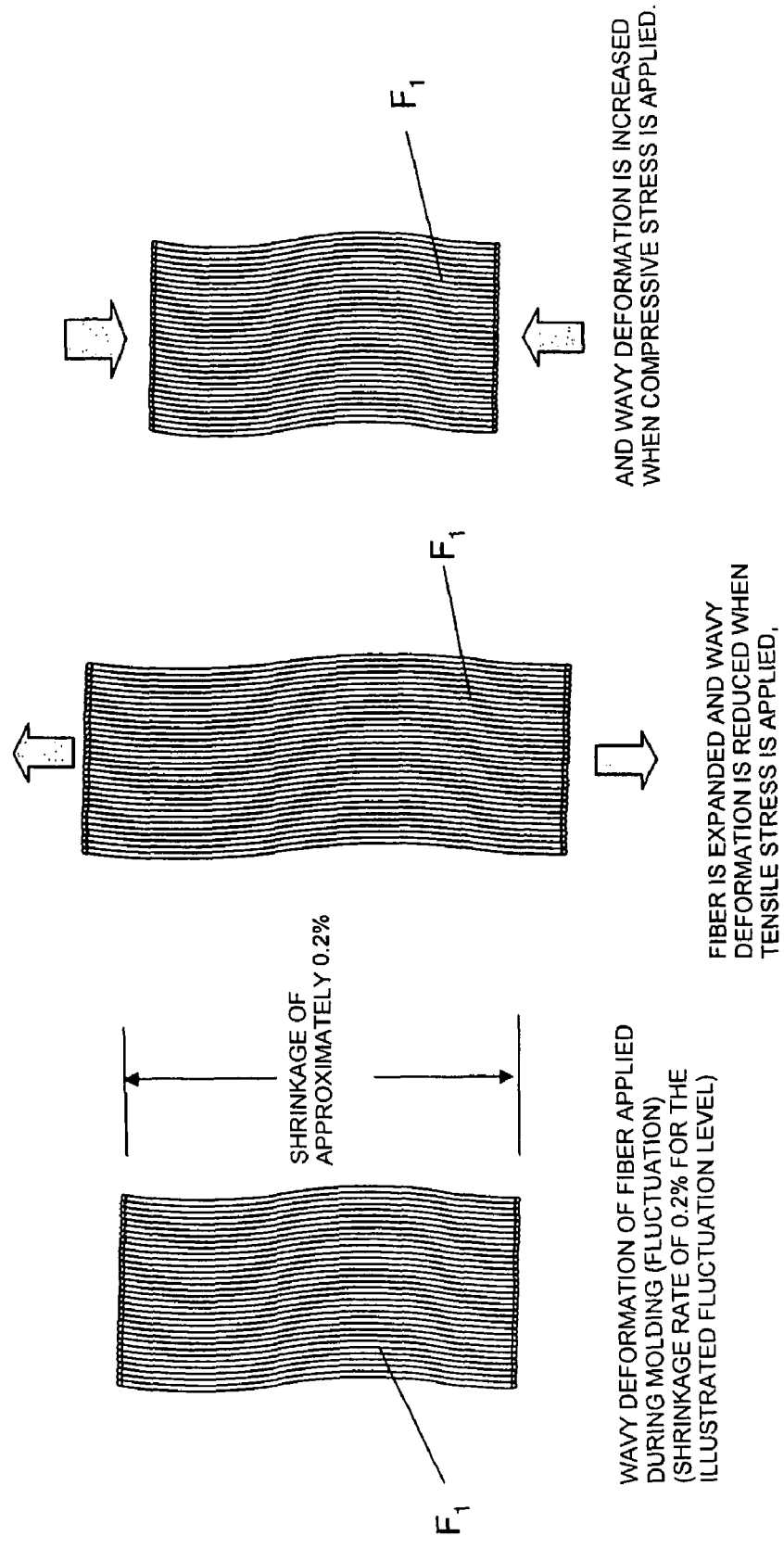
FIG. 17 is a conceptual view of "fluctuation" of carbon fiber.

The adhesive bonding process is basically the same as that of the first embodiment, but as illustrated in FIG. 15-1 and FIG. 15-2, the curvature applied via a guide roller 950 is controlled by an NC device 960 enabling the curvature of the manufactured stringer to be changed in mid-course, utilizing the advantages of intermittent continuous bonding.

What is claimed is:

1. A method for continuously forming an H-shaped cross-sectioned structural member having curvature composed of a composite material mainly composed of a carbon fiber and having belt-like flanges disposed in parallel directions and a web for connecting the flanges, the method comprising:
    a step of preparing two types of T-shaped cross-sectioned constructional elements having flanges mainly composed of carbon fibers arranged in parallel with the longitudinal direction of the flange and a web composed of carbon fibers disposed with an angle with respect to the longitudinal direction of the flanges; and
    a step of continuously adhesive-bonding the webs of the constructional elements with adhesive film sandwiched between the webs,
    wherein during adhesive bonding, intermittent pressing and heating is performed repeatedly, and when pressure is not applied, the member is moved a predetermined distance.

2. A method for continuously forming an H-shaped cross-sectioned structural member having curvature composed of a composite material mainly composed of a carbon fiber and having belt-like flanges disposed in parallel directions and a web for connecting the flanges, the method comprising:
    a step of preparing two types of T-shaped cross-sectioned constructional elements having flanges mainly composed of carbon fibers arranged in parallel with the longitudinal direction of the flange and a web composed of carbon fibers disposed with an angle with respect to the longitudinal direction of the flanges; and
    a step of continuously adhesive-bonding the webs of the constructional element,
    wherein during adhesive bonding, intermittent pressing and heating is performed repeatedly, and when pressure is not applied, the member is moved a predetermined distance, and
    wherein the plurality of constructional elements are applied with pre-tensile force while performing continuous adhesive bonding to eliminate fluctuation of the carbon fibers.

3. A method for continuously forming a hat-shaped cross-sectioned structural member having curvature composed of a composite material mainly composed of a carbon fiber and having belt-like flanges disposed in parallel directions and a web for connecting the flanges, the method comprising:

a step of preparing a channel-shaped constructional element having a flange of the hat mainly composed of carbon fibers arranged in parallel with the longitudinal direction of the flange and two webs formed at both sides of the flange composed of carbon fibers disposed with an angle with respect to the longitudinal direction of the flanges, and two angle-shaped constructional elements having a flange mainly composed of carbon fibers arranged in parallel with the longitudinal direction of the flange and a web composed of carbon fibers disposed with an angle with respect to the longitudinal direction of the flanges; and a step of continuously adhesive-bonding the webs of the constructional elements with adhesive film sandwiched between the webs, wherein during adhesive bonding, intermittent pressing and heating is performed repeatedly, and when pressure is not applied, the member is moved for a predetermined distance.

4. A method for continuously forming a hat-shaped cross-sectioned structural member having curvature composed of a composite material mainly composed of a carbon fiber and having belt-like flanges disposed in parallel directions and a web for connecting the flanges, the method comprising:

a step of preparing a channel-shaped constructional element having a flange of the hat mainly composed of carbon fibers arranged in parallel with the longitudinal direction of the flange and two webs formed at both sides of the flange composed of carbon fibers disposed with an angle with respect to the longitudinal direction of the flanges, and two angle-shaped constructional elements having a flange mainly composed of carbon fibers arranged in parallel with the longitudinal direction of the flange and a web composed of carbon fibers disposed with an angle with respect to the longitudinal direction of the flanges; and a step of continuously adhesive-bonding the webs of the constructional element with adhesive film sandwiched between the webs;

wherein during adhesive bonding, intermittent pressing and heating is performed repeatedly, and when pressure is not applied, the member is moved for a predetermined distance, and wherein the plurality of constructional elements are applied with pre-tensile force while performing continuous adhesive bonding to eliminate fluctuation of the carbon fibers.

* * * * *